US011914056B2

(12) United States Patent
Ma et al.

(10) Patent No.: US 11,914,056 B2
(45) Date of Patent: Feb. 27, 2024

(54) TECHNIQUES FOR GLOBAL NAVIGATION SATELLITE SYSTEM POSITIONING

(71) Applicant: QUALCOMM Incorporated, San Diego, CA (US)

(72) Inventors: Liangping Ma, San Diego, CA (US); Ayan Sengupta, San Diego, CA (US); Xiao Feng Wang, San Diego, CA (US); Bharat Shrestha, San Diego, CA (US); Alberto Rico Alvarino, San Diego, CA (US); Mungal Singh Dhanda, Slough (GB); Umesh Phuyal, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 17/694,785

(22) Filed: Mar. 15, 2022

(65) Prior Publication Data
US 2023/0094902 A1    Mar. 30, 2023

Related U.S. Application Data

(60) Provisional application No. 63/250,576, filed on Sep. 30, 2021.

(51) Int. Cl.
*G01S 19/48* (2010.01)
*G01S 19/51* (2010.01)
*G01S 19/42* (2010.01)

(52) U.S. Cl.
CPC .............. *G01S 19/48* (2013.01); *G01S 19/51* (2013.01); *G01S 19/42* (2013.01)

(58) Field of Classification Search
CPC ........... G01S 19/48; G01S 19/51; G01S 19/42
(Continued)

(56) References Cited

U.S. PATENT DOCUMENTS 6,166,685 A    12/2000  Soliman
8,587,476 B2 * 11/2013  Hung ...................... G01S 19/51
                                                342/357.31
(Continued)

FOREIGN PATENT DOCUMENTS

WO    WO-2020162806 A2    8/2020

OTHER PUBLICATIONS

International Search Report and Written Opinion—PCT/US2022/041032—ISA/EPO—dated Feb. 10, 2023.
(Continued)

*Primary Examiner* — Chuong P Nguyen

(57) ABSTRACT

Methods, systems, and devices for wireless communications are described. A user equipment (UE) may determine a position (e.g., a global navigation satellite system (GNSS)) position of the UE based on a relative position of the UE to another UE. For example, a first UE may determine (e.g., calculate, receive) a relative position of the first UE to a second UE that is selected from a set of UEs including the first UE and the second UE to perform a position acquisition procedure to determine a position of the second UE. The first UE may determine (e.g., calculate, receive) its position based on the relative position of the first UE to the second UE and the position of the second UE and may reset a timer that indicates for the first UE to perform a position acquisition procedure upon expiration of the timer.

30 Claims, 14 Drawing Sheets

(58) Field of Classification Search
USPC .......................... 342/357.31, 357.34, 357.25
See application file for complete search history.

(56) References Cited

U.S. PATENT DOCUMENTS

| | | | |
|---|---|---|---|
| 9,651,678 B2* | 5/2017 | Hung | G01S 19/14 |
| 9,696,431 B2* | 7/2017 | Wirola | G01S 19/43 |
| 11,363,530 B2* | 6/2022 | Choi | H04W 4/46 |
| 11,438,869 B2* | 9/2022 | Bao | G01S 5/0205 |
| 11,595,931 B2* | 2/2023 | Bao | H04W 76/14 |
| 2017/0359713 A1 | 12/2017 | Fodor et al. | |
| 2022/0015057 A1* | 1/2022 | Bao | H04W 76/14 |
| 2022/0272634 A1* | 8/2022 | Choi | H04W 52/0229 |
| 2022/0360943 A1* | 11/2022 | Edge | G01S 5/0244 |
| 2023/0086126 A1* | 3/2023 | Nam | H04W 72/51 |
| | | | 370/329 |
| 2023/0140535 A1* | 5/2023 | Ma | H04W 56/0045 |
| | | | 370/316 |
| 2023/0184870 A1* | 6/2023 | Shuman | H04W 56/006 |
| | | | 455/456.1 |

OTHER PUBLICATIONS

Partial International Search Report—PCT/US2022/041032—ISA/EPO—dated Nov. 29, 2022.

* cited by examiner

US 11,914,056 B2

TECHNIQUES FOR GLOBAL NAVIGATION SATELLITE SYSTEM POSITIONING

CROSS REFERENCE

The present Application for Patent claims the benefit of U.S. Provisional Patent Application No. 63/250,576 by M A et al., entitled "TECHNIQUES FOR GLOBAL NAVIGATION SATELLITE SYSTEM POSITIONING," filed Sep. 30, 2021, assigned to the assignee hereof, and expressly incorporated by reference herein.

FIELD OF TECHNOLOGY

The following relates to wireless communications, including techniques for global navigation satellite system (GNSS) positioning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may periodically determine its position using a global navigation satellite system (GNSS). In some cases, however, such periodic determination of the position of the UE may be associated with relatively high power consumption.

SUMMARY

The described techniques relate to improved methods, systems, devices, and apparatuses that support techniques for global navigation satellite system (GNSS) positioning. Generally, the described techniques provide for reducing a frequency of performing acquisition procedures to determine UE positions by using relative positions of UEs of a set of UEs to determine UE positions. For example, a first UE of a set of UEs may be selected to perform a position acquisition procedure to determine a position of the first UE, and as such, may be referred to as a reference UE. The positions of the UEs may remain relatively static with respect to each other. That is, while the positions of the UEs may change (e.g., global positions of the UEs), relative positions of the UEs with respect to each other may go relatively unchanged. Accordingly, by determining the position of a reference UE, other UEs of the set of UEs—which may be referred to as non-reference UEs—may determine their respective positions based on respective relative positions to the reference UE. For example, a second UE of the set of UEs may calculate its position (e.g., global position) by using the position of the first UE and a relative position of the second UE to the first UE. Alternatively, a third UE of the set of UEs, which may be referred to as a location management UE, may calculate the position of the second UE using the position of the first UE and the relative position of the second UE to the first UE and may transmit an indication of the position of the second UE to the second UE.

In response to determining the position of the second UE, the second UE may reset a timer corresponding to a valid position of the second UE. For example, as the position of the second UE changes with time, time and frequency compensations associated with communicating with a GNSS may change. Accordingly, an expiration of the timer may indicate for the second UE to determine its position (e.g., via a position acquisition procedure), for example, to determine whether the time and frequency compensations have changed. In some examples, the expiration of the timer may disable the second UE from using the previously determined time and/or frequency compensation for uplink transmissions, which may reduce or prevent interference due to timing and/or frequency synchronization errors from different UEs at the gNB. By resetting the timer in response to determining the position of the second UE based on the relative position, the second UE may reduce a frequency of performing the position acquisition procedure, thereby reducing power consumption associated with performing the position acquisition procedure.

A method for wireless communication at a first UE is described. The method may include initiating a timer based on performing a position acquisition procedure using a GNSS to determine a first position of the first UE, where an expiration of the timer indicates for the first UE to perform the position acquisition procedure, determining, prior to the expiration of the timer, a second position of the first UE based on a relative position of the first UE to a second UE, and resetting the timer in response to determining the second position of the first UE.

An apparatus for wireless communication at a first UE is described. The apparatus may include a processor, memory coupled with the processor, and instructions stored in the memory. The instructions may be executable by the processor to cause the apparatus to initiate a timer based on performing a position acquisition procedure using a GNSS to determine a first position of the first UE, where an expiration of the timer indicates for the first UE to perform the position acquisition procedure, determine, prior to the expiration of the timer, a second position of the first UE based on a relative position of the first UE to a second UE, and reset the timer in response to determining the second position of the first UE.

Another apparatus for wireless communication at a first UE is described. The apparatus may include means for initiating a timer based on performing a position acquisition procedure using a GNSS to determine a first position of the first UE, where an expiration of the timer indicates for the first UE to perform the position acquisition procedure, determining, prior to the expiration of the timer, a second position of the first UE based on a relative position of the first UE to a second UE, and means for resetting the timer in response to determining the second position of the first UE.

A non-transitory computer-readable medium storing code for wireless communication at a first UE is described. The code may include instructions executable by a processor to initiate a timer based on performing a position acquisition procedure using a GNSS to determine a first position of the first UE, where an expiration of the timer indicates for the first UE to perform the position acquisition procedure, determine, prior to the expiration of the timer, a second position of the first UE based on a relative position of the first UE to a second UE, and reset the timer in response to determining the second position of the first UE.

In some examples of the method, apparatuses, and non-transitory computer-readable medium described herein, the second UE is selected from a set of UEs including the first UE and the second UE to perform a second position acquisition procedure using the GNSS, the second position of the first UE determined based on the second UE being selected from the set of UEs to perform the second position acquisition procedure.

Some examples of the method, apparatuses, and non-transitory computer-readable medium described herein may further include operations, features, means, or instructions for calculating the relative position of the first UE to the second UE based on a previous position of the first UE and a position of the second UE at a time of the previous position of the first UE.

Some examples of the method, apparatuses, and non-transitory computer-readable medium described herein may further include operations, features, means, or instructions for transmitting, to a network, the second UE, or a third UE of a set of UEs including the first UE, the second UE, and the third UE, a set of measurements including a round trip time (RTT) associated with communications between the first UE and the second UE, a time of flight associated with the communications between the first UE and the second UE, an angle of arrival associated with the communications between the first UE and the second UE, or a combination thereof and receiving, from the network, the second UE, or the third UE, an indication of the relative position of the first UE to the second UE based on the set of measurements.

Some examples of the method, apparatuses, and non-transitory computer-readable medium described herein may further include operations, features, means, or instructions for calculating the relative position of the first UE to the second UE based on a distance from the first UE to the second UE, an orientation of a vehicle on which the first UE and the second UE may be located, or a combination thereof.

Some examples of the method, apparatuses, and non-transitory computer-readable medium described herein may further include operations, features, means, or instructions for determining the distance from the first UE to the second UE based on an RTT associated with communications between the first UE and the second UE or a time of flight associated with the communications between the first UE and the second UE.

Some examples of the method, apparatuses, and non-transitory computer-readable medium described herein may further include operations, features, means, or instructions for receiving, from the second UE or a third UE of a set of UEs including the first UE, the second UE, and the third UE, an indication of the orientation of the vehicle.

In some examples of the method, apparatuses, and non-transitory computer-readable medium described herein, the relative position of the first UE to the second UE for determining the second position of the first UE is configured to be a null distance. In some examples of the method, apparatuses, and non-transitory computer-readable medium described herein, determining the second position of the first UE may include operations, features, means, or instructions for determining that the second position of the first UE corresponds to a position of the second UE based on the relative position of the first UE to the second UE being configured to be the null distance.

In some examples of the method, apparatuses, and non-transitory computer-readable medium described herein, determining the second position of the first UE may include operations, features, means, or instructions for calculating the second position of the first UE based on a position of the second UE and the relative position of the first UE to the second UE.

Some examples of the method, apparatuses, and non-transitory computer-readable medium described herein may further include operations, features, means, or instructions for receiving, from a network, the second UE, or a third UE of a set of UEs including the first UE, the second UE, and the third UE, an indication of the position of the second UE.

Some examples of the method, apparatuses, and non-transitory computer-readable medium described herein may further include operations, features, means, or instructions for receiving, from a network, the second UE, or a third UE of a set of UEs including the first UE, the second UE, and the third UE, an indication of the second position of the first UE, where determining the second position of the first UE may be based on receiving the indication.

Some examples of the method, apparatuses, and non-transitory computer-readable medium described herein may further include operations, features, means, or instructions for transmitting, to a network, a first set of parameters including a signal-to-noise ratio (SNR) of a signal received from the GNSS, a remaining battery power of the first UE, one or more pathloss values associated with communicating with a set of UEs including the first UE and the second UE, or a combination thereof and receiving, from the network, an indication that the second UE may be selected from the set of UEs to perform a second position acquisition procedure using the GNSS based on the first set of parameters.

In some examples of the method, apparatuses, and non-transitory computer-readable medium described herein, broadcasting, to a set of UEs including the first UE and the second UE, a first indication of a first set of parameters including an SNR of a first signal received at the first UE from the GNSS, a remaining battery power of the first UE, one or more pathloss values from the first UE to the set of UEs, or a combination thereof, receiving, from one or more UEs of the set of UEs including at least the second UE, one or more second indications of one or more second sets of parameters including an SNR of a second signal received at a respective UE of the one or more UEs from the GNSS, a remaining battery power of the respective UE, one or more pathloss values from the respective UE to the set of UEs, or a combination thereof, and selecting the second UE to perform a second position acquisition procedure using the GNSS based on the first set of parameters and the one or more second sets of parameters.

Some examples of the method, apparatuses, and non-transitory computer-readable medium described herein may further include operations, features, means, or instructions for determining, after resetting the timer, a third position of the first UE based on: a second relative position of the first UE to a third UE of a set of UEs including the first UE, the second UE, and the third UE, and the third UE being selected from the set of UEs to perform a second position acquisition procedure using the GNSS. Some examples of the method, apparatuses, and non-transitory computer-readable medium described herein may further include operations, features, means, or instructions for resetting the timer in response to determining the second position of the first UE.

Some examples of the method, apparatuses, and non-transitory computer-readable medium described herein may further include operations, features, means, or instructions for performing a second position acquisition procedure using the GNSS to determine a third position of the first UE based on an expiration of a second timer, where the timer may have a first duration shorter than a second duration of the second timer.

Some examples of the method, apparatuses, and non-transitory computer-readable medium described herein may further include operations, features, means, or instructions for transmitting an uplink message to a network, where a time compensation, a frequency compensation, or a combination thereof, associated with transmitting the uplink message may be based on the second position of the first UE determined based on the relative position of the first UE to the second UE.

A method for wireless communication at a UE is described. The method may include broadcasting one or more parameters associated with the UE to a set of UEs including the UE, performing a position acquisition procedure based on the UE being selected from the set of UEs to perform the position acquisition procedure, where the UE is selected based on the broadcasted one or more parameters, and communicating information associated with the position acquisition procedure.

An apparatus for wireless communication at a UE is described. The apparatus may include a processor, memory coupled with the processor, and instructions stored in the memory. The instructions may be executable by the processor to cause the apparatus to broadcast one or more parameters associated with the UE to a set of UEs including the UE, perform a position acquisition procedure based on the UE being selected from the set of UEs to perform the position acquisition procedure, where the UE is selected based on the broadcasted one or more parameters, and communicate information associated with the position acquisition procedure.

Another apparatus for wireless communication at a UE is described. The apparatus may include means for broadcasting one or more parameters associated with the UE to a set of UEs including the UE, means for performing a position acquisition procedure based on the UE being selected from the set of UEs to perform the position acquisition procedure, where the UE is selected based on the broadcasted one or more parameters, and means for communicating information associated with the position acquisition procedure.

A non-transitory computer-readable medium storing code for wireless communication at a UE is described. The code may include instructions executable by a processor to broadcast one or more parameters associated with the UE to a set of UEs including the UE, perform a position acquisition procedure based on the UE being selected from the set of UEs to perform the position acquisition procedure, where the UE is selected based on the broadcasted one or more parameters, and communicate information associated with the position acquisition procedure.

In some examples of the method, apparatuses, and non-transitory computer-readable medium described herein, performing the position acquisition procedure may include operations, features, means, or instructions for determining a position of the UE using signals transmitted from a GNSS.

Some examples of the method, apparatuses, and non-transitory computer-readable medium described herein may further include operations, features, means, or instructions for determining, based on the position of the UE, a time compensation, a frequency compensation, or a combination thereof, associated with transmitting uplink messages to one or more non-terrestrial base stations.

In some examples of the method, apparatuses, and non-transitory computer-readable medium described herein, performing the position acquisition procedure may include operations, features, means, or instructions for establishing a connection with a network and receiving, from a location server of the network, an indication of a position of the UE based on establishing the connection.

In some examples of the method, apparatuses, and non-transitory computer-readable medium described herein, a second UE of the set of UEs includes the location server and the indication of the position of the UE may be received from the second UE.

In some examples of the method, apparatuses, and non-transitory computer-readable medium described herein, communicating the information associated with the position acquisition procedure may include operations, features, means, or instructions for broadcasting a position of the UE to the set of UEs.

Some examples of the method, apparatuses, and non-transitory computer-readable medium described herein may further include operations, features, means, or instructions for receiving, from one or more UEs of the set of UEs, one or more indications of one or more sets of parameters including an SNR of a signal received at a respective UE of the one or more UEs from a GNSS, a remaining battery power of the respective UE, one or more pathloss values from the respective UE to the set of UEs, or a combination thereof and selecting the UE to perform the position acquisition procedure based on the one or more parameters and the one or more sets of parameters.

In some examples of the method, apparatuses, and non-transitory computer-readable medium described herein, the one or more parameters include an SNR of a first signal received at the UE from a GNSS, a remaining battery power of the UE, one or more pathloss values from the UE to the set of UEs, or a combination thereof.

DETAILED DESCRIPTION

Figure 1:
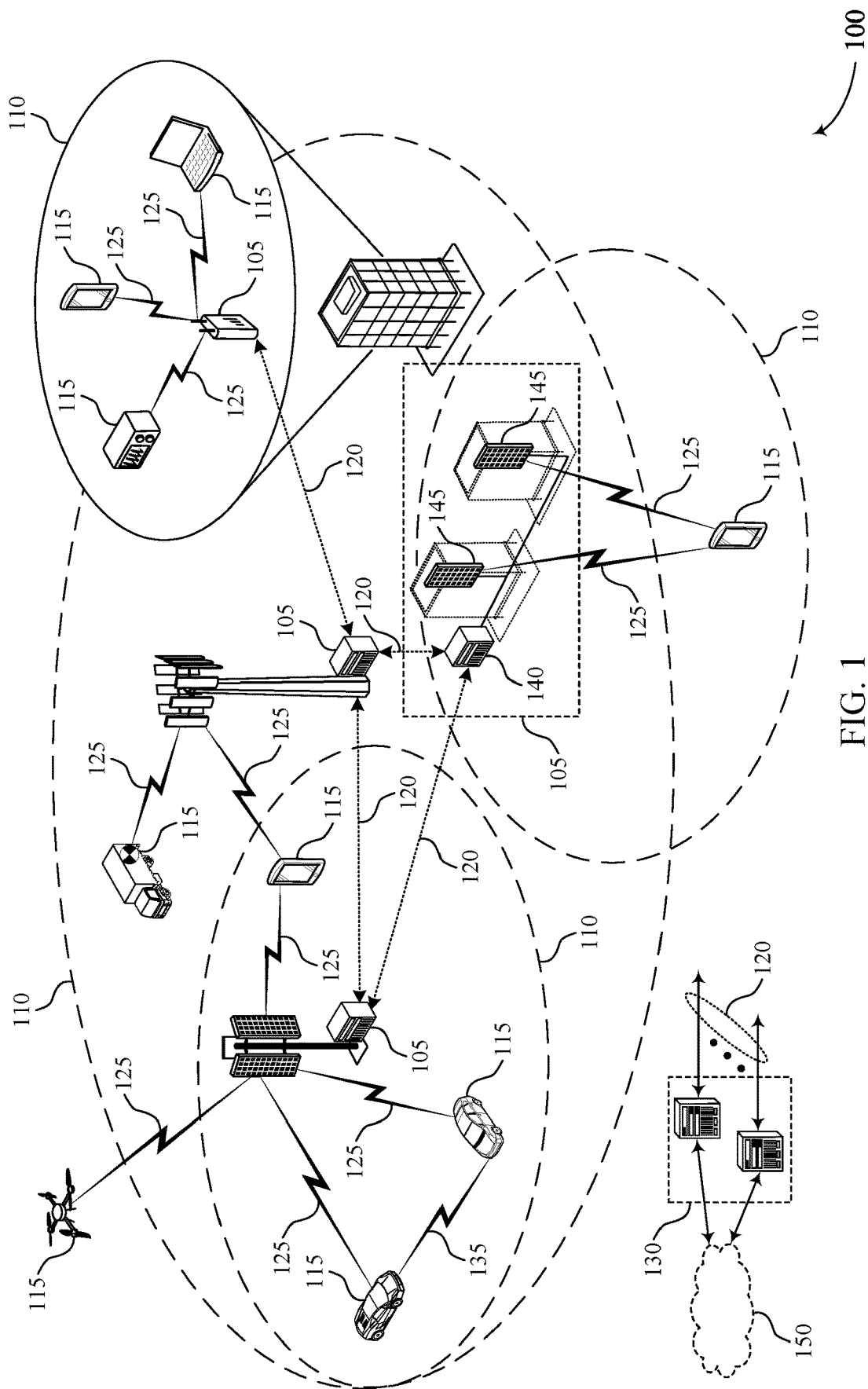
FIGS. 1 and 2 illustrate examples of wireless communications systems that supports techniques for global navigation satellite system (GNSS) positioning in accordance with aspects of the present disclosure.

Some wireless communications systems may support non-terrestrial network (NTN) communications in which a UE may communicate with a core network via one or more NTN base stations (e.g., a satellite, a high-altitude platform base station, a balloon, an airplane, a drone, an unmanned aerial vehicle, among other NTN base stations). In some cases, a distance between the UE and an NTN base station may be large (e.g., thousands of kilometers) such that it may take some time for signals to travel over the distance. Thus, delays associated with NTN communications (e.g., propagation delays, round trip delays, etc.) may be larger than (e.g., many orders of magnitude larger than) delays associated with terrestrial network communications. As a result, NTN communications may experience and suffer from uplink timing and frequency variations.

In some examples, a UE may perform a position acquisition procedure (e.g., using a global navigation satellite system (GNSS), using network-based positioning techniques) to determine its position (e.g., location, global position) and may determine time and frequency compensations for the uplink timing and frequency variations based on its position (e.g., and satellite ephemeris information). In some examples, the UE may periodically perform the position acquisition procedure in accordance with a validity timer (e.g., a validity duration) in order to maintain valid time and frequency compensations as the position of the UE changes. However, in some cases, performing the position acquisition procedure may consume a relatively high level of power (e.g., 30 milliwatts (mW), 60 mW, or some other level of power consumption), and thus, periodically performing the position acquisition procedure may be associated with a relatively high level of power consumption.

Techniques, systems, and devices are described herein for reducing a frequency at which UEs perform position acquisition procedures. For example, a set of UEs may have relative positions with respect to each other (e.g., that remain relatively static or unchanged) that may be used to determine the positions (e.g., location, global position) of each UE from known position information for one or more of the UEs. For instance, the set of UEs (e.g., Internet-of-Things (IoT) devices) may be associated with (e.g., attached to, included in) shipping containers on a ship whose positions may be relatively static (e.g., fixed) while on the ship. Accordingly, while the positions of the UEs may change over time (e.g., based on movement of the ship), the relative positions of the UEs with respect to each other may go relatively unchanged.

A first UE of the set of UEs may be selected as a reference UE to perform a position acquisition procedure to determine its own position (e.g., location, global position). One or more other UEs of the set of UEs, which may be referred to as non-reference UEs, may determine their respective positions based on the position of the first UE and respective relative positions to the first UE. For example, a second UE of the set of UEs (e.g., a non-reference UE) may calculate its position (e.g., global position) by using the position of the first UE and a relative position of the second UE to the first UE. Alternatively, a third UE of the set of UEs, which may be referred to as a location management UE, may calculate the position of the second UE using the position of the first UE and the relative position of the second UE to the first UE and may transmit an indication of the position of the second UE to the second UE. In this way, the second UE may determine its position without performing a position acquisition procedure, thereby reducing a power consumption associated with determining the position of the second UE and increasing a battery life of the second UE.

In response to determining the position of the second UE, the second UE may reset a validity timer. For example, the second UE may maintain valid time and frequency compensations based on determining its position, and thus, may delay performing a position acquisition procedure by resetting the validity timer, thereby reducing a frequency of performing the position acquisition procedure. In some examples, reference UE selection may rotate among the set of UEs, and thus, the power consumption burden associated with performing the position acquisition procedure may be shared between the set of UEs, thus reducing a power consumption of the set of UEs.

Aspects of the disclosure are initially described in the context of wireless communications systems. Aspects of the disclosure are additionally described in the context of a communication sequence and a process flow. Aspects of the disclosure are further illustrated by and described with reference to apparatus diagrams, system diagrams, and flowcharts that relate to techniques for GNSS positioning.

FIG. 1 illustrates an example of a wireless communications system 100 that supports techniques for GNSS positioning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some examples, the UEs 115 may support one or more resource allocation modes to coordinate sidelink communications between UEs 115 (e.g., over D2D communication links 135). For example, the UEs 115 may be configured to operate according a Mode 1 resource allocation mode and/or a Mode 2 resource allocation mode. While operating in Mode 1, sidelink communications may be managed (e.g., coordinated) by a base station 105. For example, during Mode 1 operation, the base station 105 may manage sidelink resource allocation for sidelink communications between the UEs 115.

While operating in Mode 2, sidelink communications may not be managed or coordinated by the base station 105. Without coordination or management of sidelink resources during the Mode 2 operation, UEs 115 may follow contention-based access procedures in which the various UEs 115 may reserve sidelink resources of configured sidelink resource pools. For example, during Mode 2 operation, a UE 115 may monitor the one or more sidelink resource pools to determine if other UEs 115 are attempting to transmit over sidelink resources of the sidelink resource pools. For instance, the UE 115 may decode one or more reservation messages (e.g., sidelink control channel transmissions such as sidelink control information (SCI) messages, SCI-1 messages, SCI-2 messages, request-to-send-messages, or some other sidelink control channel transmissions) and may determine which sidelink resources are reserved for other sidelink communications and which sidelink resources are available for sidelink communications based on the reservation messages.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

As described herein, a base station 105 may include one or more components that are located at a single physical location or one or more components located at various physical locations, and any one or more of such components may be referred to herein as a network entity or a network device. In examples in which the base station 105 includes components that are located at various physical locations, the various components may each perform various functions such that, collectively, the various components achieve functionality that is similar to a base station 105 that is located at a single physical location. As such, a base station 105 or network entity described herein may equivalently refer to a standalone base station (also known as a monolithic base station) or a base station 105 including network entity components that are located at various physical locations or virtualized locations (also known as a disaggregated base station 105). In some implementations, such a base station 105 including network entity components that are located at various physical locations may be referred to as or may be associated with a disaggregated radio access network (RAN) architecture, such as an Open RAN (O-RAN) or Virtualized RAN (VRAN) architecture. In some implementations, such network entity components of a base station 105 may include or refer to one or more of a central unit (or centralized unit CU), a distributed unit (DU), or a radio unit (RU).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be an example of an NTN. For example, the wireless communications system 100 may include base stations 105 that function as NTN nodes (e.g., non-terrestrial base stations). In some examples, an NTN node may communicate with base stations 105 (also referred to as gateways in NTNs) and UEs 115 (or other high altitude or terrestrial communications devices). An NTN node may be any suitable type of communication device configured to relay communications between different end nodes in a wireless communication system. In some cases, an NTN node may be an example of a space satellite, a balloon, a dirigible, an airplane, a drone, an unmanned aerial vehicle, and the like. In some examples, an NTN node may be in a geosynchronous or geostationary earth orbit, a low earth orbit or a medium earth orbit. In some cases, an NTN node may be a multi-beam satellite configured to provide service for multiple service beam coverage areas in a predefined geographical service area. An NTN node may be any distance away from the surface of the earth.

In some examples, a UE 115 may perform a position acquisition procedure to determine its position within the NTN. This may enable the UE 115 and the NTN to determine timing and frequency variations associated with communications between the UE 115 and one or more NTN nodes, which may improve uplink transmission scheduling and coordination. In some examples, the UE 115 may perform the position acquisition procedure using signals transmitted from a GNSS. For example, the UE 115 may perform a GNSS fix to determine its position based on the signals received from the GNSS. In some examples, the UE 115 may perform the position acquisition procedure using network-based positioning techniques. For example, the UE 115 may receive signals (e.g., positioning reference signal (PRS)) from one or more NTN nodes (e.g., base stations 105, satellites) or other UEs 115 and may measure a delay of the signals (e.g., an observed time difference of arrival (OTDOA), a reference signal time difference (RSTD). The UE 115 may transmit the delay measurement to a location server (e.g., a location management function (LMF), an Enhanced Serving Mobile Location Centre (E-SMLC), or a Secure User Plane Location (SUPL) Location Platform (SLP)) which computes the location (e.g., the position) of the UE 115. In some examples, the UE 115 may transmit one or more reference signals (e.g., a PRS, a sounding reference signal (SRS)) to a node (e.g., a base station 105, an NTN node, a second UE 115). The node may take measurements of the reference signals and may send the measurements using a positioning protocol (e.g., an LTE positioning protocol (LPP), an NR Positioning Protocol Annex (NRPPa)) message to a location server. The location server may be in the core network 130 and may know the locations of the NTN nodes. In some examples, the second UE 115 may include the location server (e.g., an LMF, an E-SMLC, an SLP). Based on the delays indicated by the one or more reference signals and the known positions of the NTN nodes, the location server may determine the position of the UE 115 and may indicate the position of the UE 115 to the UE 115 (e.g., via the base station, the NTN node, or the second UE 115).

In some cases, performing a position acquisition procedure may be associated with a relatively high level of power consumption. For example, for UEs 115 that operate in accordance with discontinuous reception (DRX) cycles (e.g., IoT devices), frequently performing the position acquisition procedure may consume a significant amount of power (e.g., approximately 30 mW to 60 mW each time the position acquisition procedure is performed). Accordingly, reducing a frequency of performing the position acquisition procedure may increase performance and reduce power consumption of UEs 115.

Various aspects of the described techniques support reducing a frequency at which UEs 115 perform position acquisition procedures by supporting position determination procedures based on relative positions of the UEs 115. For example, a reference UE 115 of a set of UEs 115 may perform a position acquisition procedure to determine its position, and non-reference UEs 115 of the set of UEs may determine their respective positions based on the position of the reference UE 115 and respective relative positions of the non-reference UEs 115 to the reference UE 115. In response to determining their respective positions, the non-reference UEs 115 may reset respective validity timers that indicate for the non-reference UEs 115 to perform position acquisition procedures upon expiring, thus delaying and reducing a frequency of a performance of the position acquisition procedures.

Figure 2:
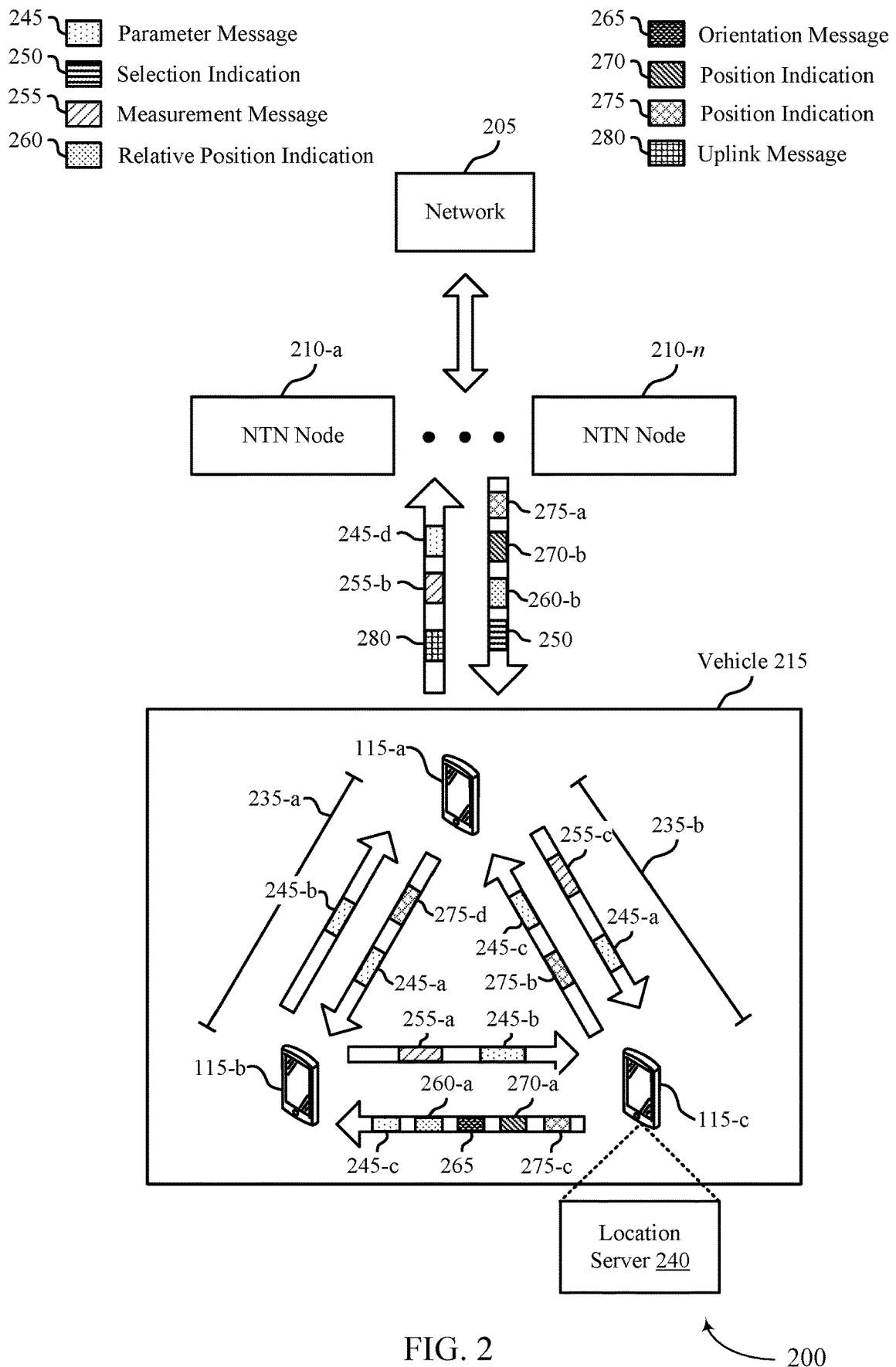

FIG. 2 illustrates an example of a wireless communications system 200 that supports techniques for GNSS positioning in accordance with aspects of the present disclosure. The wireless communications system 200 may implement aspects of the wireless communications system 100 or may be implemented by aspects of the wireless communications system 100. For example, the wireless communications system 200 may include a UE 115-a, a UE 115-b, and a UE 115-c, which may be examples of a UE 115 described with reference to FIG. 1. Additionally, the wireless communications system 200 may include NTN nodes 210 and a network 205, which may be examples of NTN nodes and a core network 130 described with reference to FIG. 1, respectively. The wireless communications system 200 may support position determination procedures using relative positioning to support improvements to power consumption, battery life, processing capability, coordination between devices, and resource utilization efficiency, among other benefits.

The wireless communications system 200 may be an example of an NTN, in which the UEs 115 may communicate with the network 205 via one or more NTN nodes 210. For example, the UEs 115 may access the network 205 by communicating message (e.g., uplink messages, downlink messages) via one or more of the NTN nodes 210-a through 210-n. In some examples, the UEs 115 may access the network 205 via a base station 105 (not shown).

The wireless communications system 200 may support sidelink communications between the UEs 115. For example, each of the UEs 115-a, 115-b, and 115-c may communicate sidelink messages via one or more sidelinks (e.g., D2D communications links 135 described with reference to FIG. 1). In some examples, the wireless communications system 200 may support Mode 1 and/or Mode 2 sidelink resource allocation modes. It is noted that, for illustrative purposes, the wireless communications system 200 is depicted as including three UEs 115. However, the techniques described herein may be adapted and applied such that the wireless communications system 200 may include any quantity of UEs 115.

In some examples, the UEs 115 may be located on a vehicle 215 that travels and thus changes position with time. For example, the vehicle 215 may be an example of a ship, a truck, an airplane, or some other type of vehicle. In some cases, positions of the UEs 115 on the vehicle 215 may be relatively fixed (e.g., static, unchanged over a period of time). For example, if the vehicle 215 is a ship, the UEs 115 may be attached to, located in, or located on shipping containers transported by the ship. Thus, as the position of the vehicle 215 changes, the global positions of the UEs 115 may change too, however, the positions of the UEs 115 on the vehicle 215 may go relatively unchanged, or the positions of the UEs 115 may remain relatively close to each other. As a result, the positions of the UEs 115 may be derivable (e.g., calculated) based on a position of at least one of the UEs 115 (e.g., based on relative positions of the UEs 115 to the at least one UE 115).

In some examples, the UEs 115 may perform a position acquisition procedure to determine their respective global positions and maintain valid time and frequency compensations as the vehicle 215 travels. In order to reduce a frequency of performing the position acquisition procedure, one or more of the UEs 115 may be configured to determine their respective positions based on relative positions of the UEs 115 with respect to each other.

For example, one or more of the UEs 115 may be selected as a reference UE that performs the position acquisition procedure, while the other UEs 115 may be selected as non-reference UEs that determine their positions based on respective relative positions from the non-reference UEs to one or more of the reference UEs. Reference UEs may be selected according to various techniques. In some examples, the UEs 115 may perform the reference UE selection based on consensus election or parameter exchange, or both. For example, each of the UE 115-a, the UE 115-b, and the UE 115-c may broadcast a parameter message 245 to the other UEs 115 that indicates a set of parameters associated with each respective UE 115 and may be used in the reference UE selection. For instance, the UE 115-a may broadcast a parameter message 245-a to the UE 115-b and the UE 115-c that indicates a first set of parameters associated with the UE 115-a. In some examples, the first set of parameters may include a signal-to-noise ratio (SNR) of a first signal received at the UE 115-a from a GNSS or from one or more of the NTN nodes 210, a remaining battery power of the UE 115-a, one or more pathloss values from the UE 115-a to the UE 115-b and the UE 115-c (e.g., a pathloss value indicating a pathloss between the UE 115-a and the UE 115-b, a pathloss value indicating a pathloss between the UE 115-a and the UE 115-c), or a combination thereof. Additionally, the UE 115-b may broadcast a parameter message 245-b to the UE 115-a and the UE 115-c that indicates a second set of parameters associated with the UE 115-b (e.g., an SNR of a second signal received at the UE 115-b from the GNSS or an NTN node 210, a remaining battery power of the UE 115-b, one or more pathloss values from the UE 115-b to the UE 115-a or the UE 115-c, or a combination thereof). Further, the UE 115-c may broadcast a parameter message 245-c to the UE 115-a and the UE 115-b that indicates a third set of parameters associated with the UE 115-c (e.g., an SNR of a second signal received at the UE 115-c from the GNSS or an NTN node 210, a remaining battery power of the UE 115-c, one or more pathloss values from the UE 115-c to the UE 115-a or the UE 115-b, or a combination thereof).

The UEs 115 may select which one or more of the UEs 115 are to function as reference UEs based on the sets of parameters indicated via the parameter messages 245. For example, the UEs 115 may combine the indicated sets of parameters and select the one or more reference UEs 115 based on the combination of parameters. For example, the UEs 115 may select a UE 115 having a relatively higher SNR, a relatively greater remaining battery power, relatively smaller pathloss values, or a combination thereof, as a reference UE. In the example of FIG. 2, the UEs 115 may select the UE 115-a to operate as the reference UE, and the UE 115-b and the UE 115-c may be selected to operate as non-reference UEs.

In some examples, the reference UE selection may be performed by the network 205. For example, the UE 115-a, the UE 115-b, and the UE 115-c may each transmit a respective parameter message 245 (e.g., represented by a parameter message 245-d) that indicates the first set of parameters, the second set of parameters, and the third set of parameters, respectively, to the network 205. The network 205 may combine the indicated sets of parameters and may select the one or more reference UEs based on the combination of parameters. For example, the network 205 may select a UE 115 having a relatively higher SNR, a relatively greater remaining battery power, relatively smaller pathloss values, or a combination thereof, as a reference UE. In the example of FIG. 2, the network 205 may select the UE 115-a to operate as the reference UE and may transmit a selection indication 250 to the UE 115-a, the UE 115-b, and the UE 115-c that indicates the selection of the UE 115-a as the reference UE. In some examples, the selection indication 250 may indicate that the UE 115-b and the UE 115-c are selected to operate as non-reference UEs.

Based on being selected as the reference UE, the UE 115-a may perform a position acquisition procedure to determine the position of the UE 115-a. In some examples, to perform the position acquisition procedure, the UE 115-a may use positioning signals transmitted from the GNSS to determine its position. In some examples, to perform the position acquisition procedure, the UE 115-a may establish a connection with the network 205 and transmit one or more reference signals to the network that indicate delays associated with communicating with the NTN nodes 210. The network 205 may include a location server that knows the positions of the NTN nodes 210 and, based on the indicated delays and the known positions of the NTN nodes 210, may determine the position of the UE 115-a. In some examples, the network 205 may transmit (e.g., via one or more of the NTN nodes 210) a position indication 275-a to the UE 115-a to indicate the position of the UE 115-a to the UE 115-a. In some examples, the UE 115-c may include a location server 240 that may perform one or more of the functions of the location server included in the network 205. For example, the UE 115-a may transmit the one or more reference signals to the UE 115-c, which may determine the position of the UE 115-a using the location server 240 and transmit a position indication 275-b that indicates the position of the UE 115-a to the UE 115-a. Here, the UE 115-c may be referred to as a location management UE based on including aspects of the location server 240.

Non-reference UEs may determine their respective positions based on respective relative positions of the non-reference UEs to a reference UE. For example, the UE 115-b and the UE 115-c may determine their respective positions based on respective relative positions 235 of the UE 115-b and the UE 115-c to the UE 115-a. A non-reference UE may determine a relative position of the non-reference UE to the reference UE according to various techniques. For instance, in some examples, the UE 115-b may determine a relative position 235-a of the UE 115-b to the UE 115-a based on previous positions of the UE 115-b and the UE 115-a. For example, the UE 115-b may know a previous position of the UE 115-b (e.g., based on a performing a previous position acquisition procedure) and a position of the UE 115-a at a time of the previous position of the UE 115-b (e.g., based on previously receiving a position indication 275 indicating the position of the UE 115-*a* at the time of the previous position of the UE 115-*b*). The UE 115-*b* may calculate the relative position 235-*a* using the previous position of the UE 115-*b* and the position of the UE 115-*a* at the time of previous position of the UE 115-*b* (e.g., based on a distance between the previous positions). Additionally, the UE 115-*c* may calculate a relative position 235-*b* of the UE 115-*c* to the UE 115-*a* using a previous position of the UE 115-*c* and a position of the UE 115-*a* at a time of the previous position of the UE 115-*c*.

In some examples, the UE 115-*b* may determine the relative position 235-*a* based on receiving a relative position indication 260 from a location management UE (e.g., the UE 115-*c*) or the network 205 that indicates the relative position 235-*a*. For example, the UE 115-*b* may transmit a measurement message 255 to the UE 115-*c* (e.g., a measurement message 255-*a*) or to the network 205 (e.g., a measurement message 255-*b*) that includes a first set of measurements which may be used to determine the relative position 235-*a*. In some cases, the UE 115-*a* may transmit a measurement message 255 (e.g., a message in a positioning protocol, such as an LPP or an NRPPa) to the UE 115-*c* (e.g., a measurement message 255-*c*) or to the network 205 (e.g., the measurement message 255-*b*) that includes a second set of measurements which may be used to determine the relative position 235-*a*. For example, the first set of measurements and/or the second set of measurements may include a round trip time (RTT) associated with communications between the UE 115-*a* and the UE 115-*b* (e.g., a time for a signal to travel to the UE 115-*a* or the UE 115-*b* and for an acknowledgement of the signal to be received at the UE 115-*a* or the UE 115-*b*), a time of flight associated with the communications between the UE 115-*a* and the UE 115-*b* (a time for a signal to travel from the UE 115-*a* to the UE 115-*b*, or vice versa), an OTDOA or an RSTD associated with the communications between the UE 115-*b* and the UE 115-*a* and the communications between the UE 115-*c* and the UE 115-*a*, an angle of arrival associated with the communications between the UE 115-*a* and the UE 115-*b*, an angle of departure (e.g., DL-AoD) associated with the communications between the UE 115-*a* and an NTN node, or a combination thereof. Based on the indicated measurements, the UE 115-*c* or the network 205 may determine a distance between the UE 115-*a* and the UE 115-*b* and a direction of the distance, and thus may determine the relative position 235-*a* of the UE 115-*b* to the UE 115-*a*. Accordingly, the UE 115-*c* may transmit a relative position indication 260-*a* or the network 205 may transmit a relative position indication 260-*b* to the UE 115-*b* that indicates the relative position 235-*a*.

In some examples, the measurement message 255-*c* (e.g., or the measurement message 255-*b* transmitted from the UE 115-*a*) may include a third set of measurements associated with communications between the UE 115-*a* and the UE 115-*c*. Here, the UE 115-*c* or the network 205 may determine the relative position 235-*b* of the UE 115-*c* to the UE 115-*a* using the third set of measurements. In some cases, the network 205 may transmit the relative position indication 260-*b* to the UE 115-*c* that indicates the relative position 235-*b*. In some examples, the UE 115-*c* may measure a fourth set of measurements associated with communications between the UE 115-*a* and the UE 115-*c* and may calculate the relative position 235-*b* using the fourth set of measurements.

In some examples, the UE 115-*b* may determine the relative position 235-*a* based on a distance between the UE 115-*a* and the UE 115-*b* and an orientation of the vehicle 215. For example, the UE 115-*b* may determine a distance between the UE 115-*a* and the UE 115-*b* based on an RTT associated with communications between the UE 115-*a* and the UE 115-*b*, a time of flight associated with communications between the UE 115-*a* and the UE 115-*b*, or a combination thereof. In some examples, the orientation of the vehicle 215 may enable the UE 115-*b* to determine the relative position 235-*a* based on the distance between the UE 115-*a* and the UE 115-*b* (e.g., by indicating a direction of the distance between the UE 115-*a* and the UE 115-*b*). In some examples, a location management UE (e.g., the UE 115-*c*) may transmit an orientation message 265 to the UE 115-*b* that indicates the orientation of the vehicle 215 to enable the UE 115-*b* to calculate the relative position 235-*a* using the distance between the UE 115-*a* and the UE 115-*a* and the orientation of the vehicle 215. In some cases, the UE 115-*c* may determine the relative position 235-*b* based on a distance between the UE 115-*a* and the UE 115-*c* and the orientation of the vehicle 215 that is known to the UE 115-*c* (e.g., based on being a location management UE).

In some examples, the relative positions 235 may be configured as a null distance. Here, a non-reference UE may determine that its position corresponds (e.g., within a threshold) to the position of a reference UE. For example, the UE 115-*b* and the UE 115-*c* may determine their respective positions as being the same as the position of the UE 115-*a*. For instance, while the actual positions of the UE 115-*b* and the UE 115-*c* may be different from the position of the UE 115-*a*, the actual positions of the UE 115-*a*, the UE 115-*b*, and the UE 115-*c* may be close enough such that the UE 115-*a*, the UE 115-*b*, and the UE 115-*c* may experience similar timing and frequency variations, and thus time and frequency compensations for the UE 115-*a*, the UE 115-*b*, and the UE 115-*c* may be similar. Accordingly, in some cases, the UE 115-*b* and the UE 115-*c* may be configured to determine that their respective positions correspond to the position of the UE 115-*a* based on the relative positions 235 being configured as a null distance (e.g., in order to reduce signaling overhead between the UEs 115, increase resource utilization efficiency, or reduce power consumption, among other benefits).

In some examples, a non-reference UE may calculate its own position based on the position of the reference UE and a relative position of the non-reference UE to the reference UE. For example, the UE 115-*b* may receive a position indication 275-*d* from the UE 115-*a* or a position indication 275-*c* from the UE 115-*c* that indicates the position of the UE 115-*a*. The UE 115-*b* may use the position of the UE 115-*a* and the determined relative position 235-*a* in order to determine the position of the UE 115-*b*. In some examples, the UE 115-*c* may calculate the position of the UE 115-*a* and the relative position 235-*b* based on being a location management UE and may determine the position of the UE 115-*c* using the position of the UE 115-*a* and the relative position 235-*b*.

In some examples, a non-reference UE may determine its position based on receiving an indication of its position from a location management UE. For example, the location management UE may determine the position of non-reference UE using the position of the reference UE (e.g., calculated by the location management UE) and the relative position of the non-reference UE to the reference UE (e.g., calculated by the location management UE) and may transmit an indication of the position of the non-reference UE to the. For instance, the UE 115-*c* may calculate the position of the UE 115-*b* and may transmit a position indication 270-*a* to the UE 115-*b* indicating the position of the UE 115-*b*. In some examples, the network 205 may calculate the position of the UE 115-*b* using the position of the UE 115-*a* and the relative position 235-*a* and may transmit a position indication 270-*b* to the UE 115-*b* indicating the position of the UE 115-*b*.

In some examples, the UE 115-*a* may be an example of a location management UE (e.g., may include aspects of the location server 240). Here, the UE 115-*a* may perform the functions of the location management UE described herein (e.g., determining relative positions 235, transmitting orientation messages 265, transmitting position indications 275, etc.).

A non-reference UE may reset a validity timer associated with performing a position acquisition procedure in response to determining its position. For example, the UE 115-*b* and the UE 115-*c* may reset respective validity timers in response to determining their respective positions, where an expiration of a respective validity timer indicates for the UE 115-*b* and the UE 115-*c* to respectively perform a position acquisition procedure.

In some examples, different UEs 115 may be selected as the reference UE over time. For example, the reference UE selection may be performed periodically. Alternatively, the reference UE selection may be performed based on changes to sets of measurements (e.g., a change to the SNR, remaining battery power, or pathloss values of the UEs 115). Based on a change to the reference UE 115, the UEs 115 may determine new relative positions (e.g., a relative position of the UE 115-*b* to the UE 115-*c* if the UE 115-*c* is selected as a reference UE), may determine their respective positions based on the new relative positions, and reset their respective validity timers.

Based on determining their respective positions, the UE 115-*a*, the UE 115-*b*, and the UE 115-*c* may determine a time compensation, a frequency compensation, or a combination thereof, associated with transmitting uplink messages to the network 205. Accordingly, the UE 115-*a*, the UE 115-*b*, or the UE 115-*c* may transmit an uplink message 280 in accordance with the time compensation, the frequency compensation, or the combination thereof.

Figure 3:
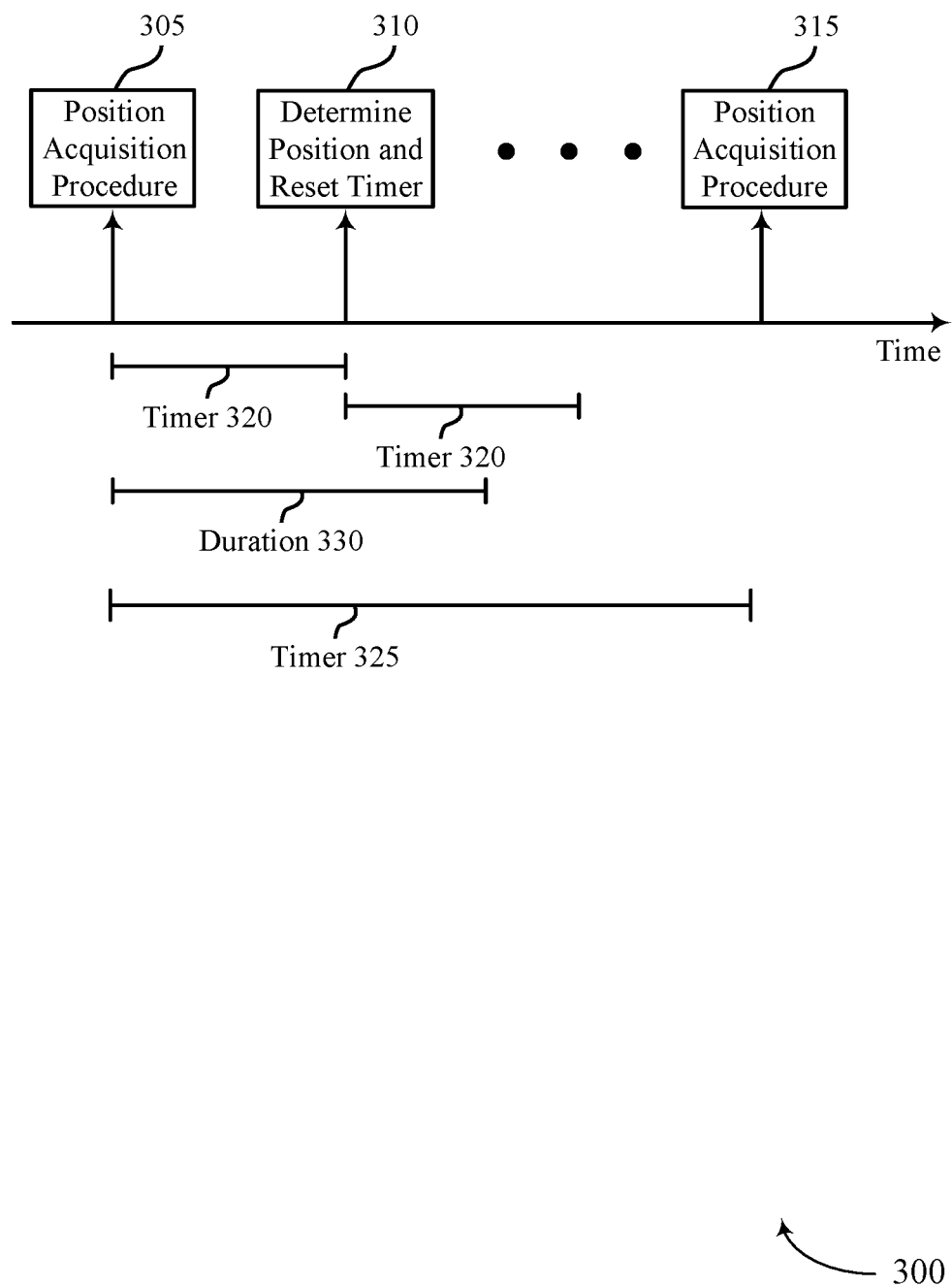
FIG. 3 illustrates an example of a communication sequence that supports techniques for GNSS positioning in accordance with aspects of the present disclosure.

FIG. 3 illustrates an example of a communication sequence 300 that supports techniques for GNSS positioning in accordance with aspects of the present disclosure. The communication sequence 300 may be implemented by aspects of the wireless communications system 100 and 200 as described with reference to FIGS. 1 and 2, respectively. For example, the communication sequence 300 may be implemented by a UE 115 to reduce a frequency of performing acquisition procedures which may provide improvements to power consumption, battery life, processing capability, coordination between devices, and resource utilization efficiency, among other benefits.

The communication sequence 300 depicts example operations performed by a non-reference UE to reduce a frequency of performing a position acquisition procedure. For example, at 305, a UE 115 may perform a position acquisition procedure 305 to determine a position of the UE 115. The UE 115 may initiate a timer 320 and, in some examples, may initiate a timer 325 in response to performing the position acquisition procedure. The timer 320 may correspond to a validity timer of the UE 115. The timer 320 may be associated with a duration 330 corresponding to an expiration of the timer 320. That is, if the timer 320 runs for at least the duration 330, thus expiring, the UE 115 may be triggered to perform the position acquisition procedure.

The UE 115 may reset and reinitiate the timer 320 each time the UE 115 determines its position, while the UE 115 may reset and reinitiate the timer 325 each time the UE 115 performs the position acquisition procedure. For example, at 310, the UE 115 may determine its position based on a relative position of the UE 115 to a reference UE. In response, the UE 115 may reset and reinitiate the timer 320. Because the UE 115 reset the timer 320, the UE 115 may refrain from performing the position acquisition procedure after the duration 330. The UE 115 may continue to reset and reinitiate the timer 320 each time the UE 115 determines its position either based on the relative position or performing the position acquisition procedure.

The UE 115 may not, however, reset the timer 325 in response to determining its position based on the relative position of the UE 115. Instead, the UE 115 may reset the timer 325 in response to performing the position acquisition procedure. In some examples, the timer 325 may trigger the UE 115 to perform the position acquisition procedure, for example, even if the UE 115 recently determined its position based on the relative position. For example, the timer 325 may continue to run as the UE 115 determines its position (e.g., repeatedly) based on the relative position and may expire upon running for the associated duration. In response, the UE 115 may perform the position acquisition procedure despite the timer 320 not expiring. In this way, the UE 115 may periodically perform the position acquisition procedure, for example, in order to ensure the position of the UE 115 is correct in the case that an illegitimate UE 115 spoofs or hijacks the functionality of the reference UE. In some examples, the timer 325 may have a longer duration than the timer 320.

Figure 4:
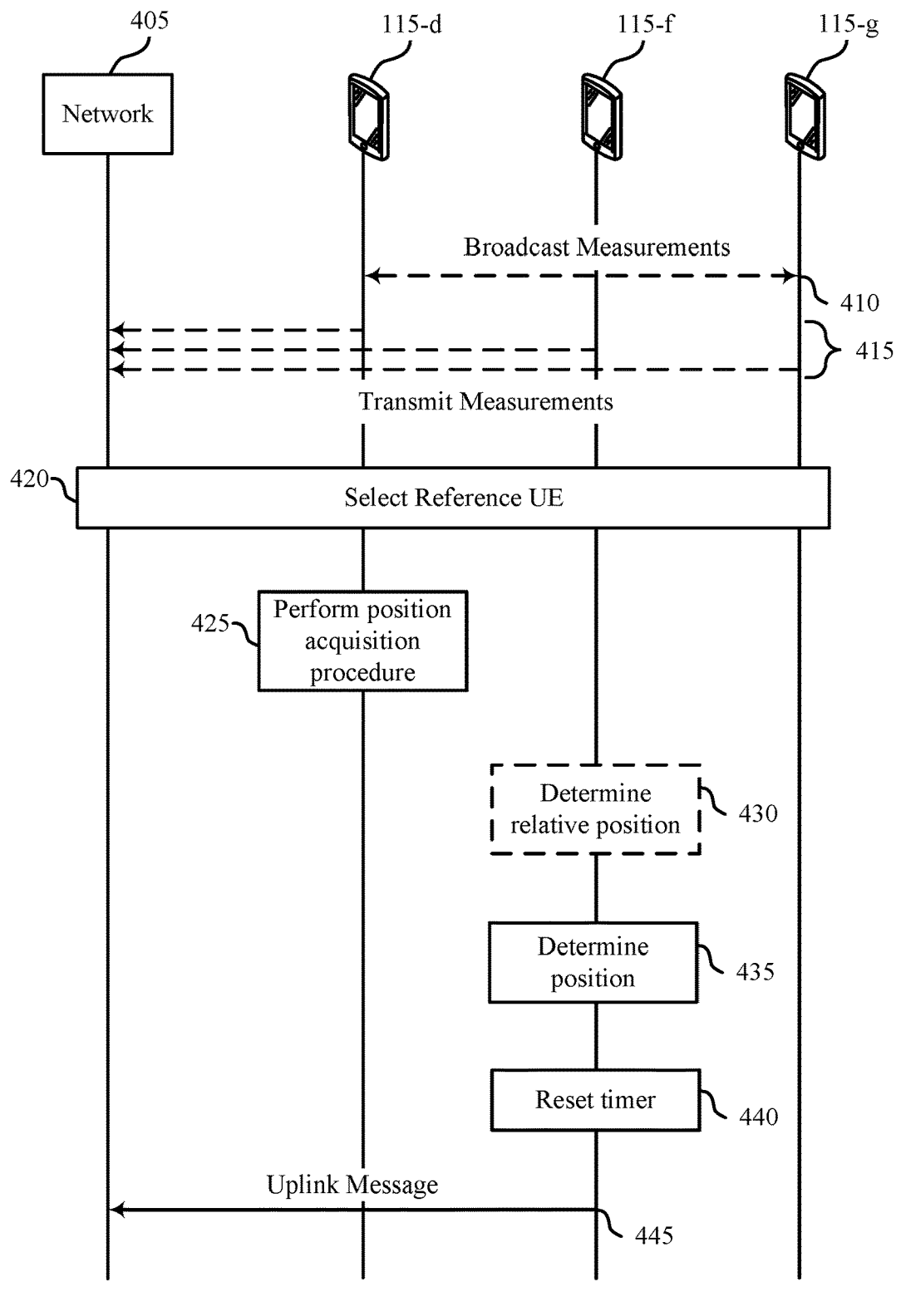
FIG. 4 illustrates an example of a process flow that supports techniques for GNSS positioning in accordance with aspects of the present disclosure.

FIG. 4 illustrates an example of a process flow 400 that supports techniques for GNSS positioning in accordance with aspects of the present disclosure. The process flow 400 may implement aspects of the wireless communications systems 100 and 200 or may be implemented by aspects of the wireless communications system 100 and 200 as described with reference to FIGS. 1 and 2, respectively. For example, the process flow 400 may be implemented by a network 405, a UE 115-*d*, a UE 115-*f*, and a UE 115-*g* to support position determination using relative positions which may provide improvements to power consumption, battery life, processing capability, coordination between devices, and resource utilization efficiency, among other benefits.

The network 405 may be an example of a core network 130 or a network 205 as described with reference to FIGS. 1 and 2. The UE 115-*d*, the UE 115-*f*, and the UE 115-*g* may be examples of a UE 115, as described with reference to FIGS. 1 through 3. In the following description of the process flow 400, the operations may be performed in different orders or at different times. Some operations may also be omitted from the process flow 400, and other operations may be added to the process flow 400.

At 410, the UE 115-*d*, the UE 115-*f*, and the UE 115-*g* may each broadcast measurements to the other UEs 115. The measurements may include SNRs of signals received from a GNSS at each of the UEs 115, remaining battery powers of the UEs 115, pathloss values associated with communications between the UEs 115, or a combination thereof.

At 415, the UE 115-*d*, the UE 115-*f*, and the UE 115-*g* may alternatively transmit the measurements to the network 405 (e.g., via one or more NTN nodes).

At 420, a reference UE selection procedure may be performed. For example, the UE 115-*d*, the UE 115-*f*, and the UE 115-*g* may select one or more of the UEs 115 to operate as reference UEs and the remaining UEs 115 to operate as non-reference UEs based on the broadcasted measurements. Alternatively, the network 405 may select one or more of the UEs 115 to operate as reference UEs based on the received measurements. Here, the network 405 may transmit a selection indication to the UE 115-*d*, the UE 115-*f*, and the UE 115-*g* to indicate which UEs 115 are to operate as reference UEs and which UEs 115 are to operate as non-reference UEs. In the example of FIG. 4, the UE 115-*d* may be selected as the reference UE.

At 425, the UE 115-*d* may perform a position acquisition procedure to determine a position of the UE 115-*d* based on being selected to operate as the reference UE. In some examples, the UE 115-*d* may use signals transmitted from the GNSS to determine the position of the UE 115-*d*. In some other examples, the UE 115-*d* may use network-based positioning techniques to determine the position of the UE 115-*d*.

At 430, the UE 115-*f* may determine a relative position of the UE 115-*f* to the UE 115-*d*. In some examples, the UE 115-*f* may calculate the relative position based on previous positions of the UE 115-*d* and the UE 115-*f* In some examples, the UE 115-*f* may calculate the relative position based on a distance between the UE 115-*d* and the UE 115-*f* and an orientation of a vehicle on which the UE 115-*d*, the UE 115-*f*, and the UE 115-*g* are located. For example, the UE 115-*g* may operate as a location management UE and may transmit an orientation of the vehicle to the UE 115-*f*, which the UE 115-*f* may use to determine the relative position. In some examples, the UE 115-*g* may transmit an indication of the relative position to the UE 115-*f*. For example, the UE 115-*f* and/or the UE 115-*d* may transmit measurements to the UE 115-*g* that include an RTT of communications between the UE 115-*d* and the UE 115-*f*, a time of flight of communications between the UE 115-*d* and the UE 115-*f*, an angle of arrival of communications between the UE 115-*d* and the UE 115-*f*, or a combination thereof, based on the UE 115-*g* functioning as a location management UE. The UE 115-*g* may determine the relative position based on the measurements and may transmit the indication of the relative position to the UE 115-*f*. In some examples, the relative position may be configured as a null distance, and the UE 115-*f* may determine the relative distance to be the null distance based on the configuration.

At 435, the UE 115-*f* may determine a position of the UE 115-*f*. For example, the UE 115-*f* may calculate the position of the UE 115-*f* using a position of the UE 115-*d* (e.g., indicated via a broadcast of the position of the UE 115-*d* by the UE 115-*d* or via an indication of the position of the UE 115-*d* transmitted by the UE 115-*g*) and the relative position of the UE 115-*f* to the UE 115-*d*. Alternatively, based on functioning as the location management UE, the UE 115-*g* may calculate the position of the UE 115-*f* using the position of the UE 115-*d* and the relative position and may transmit an indication of the position of the UE 115-*f* to the UE 115-*f*. Alternatively, the network 405 may calculate the position of the UE 115-*f* using the position of the UE 115-*d* and the relative position and may transmit the indication of the position of the UE 115-*f* to the UE 115-*f*.

At 440, the UE 115-*f* may reset a validity timer in response to determining its position.

At 445, the UE 115-*f* may transmit an uplink message to the network 405 in accordance with a time compensation, a frequency compensation, or both, that are determined based on the position of the UE 115-*f*.

Figure 5:
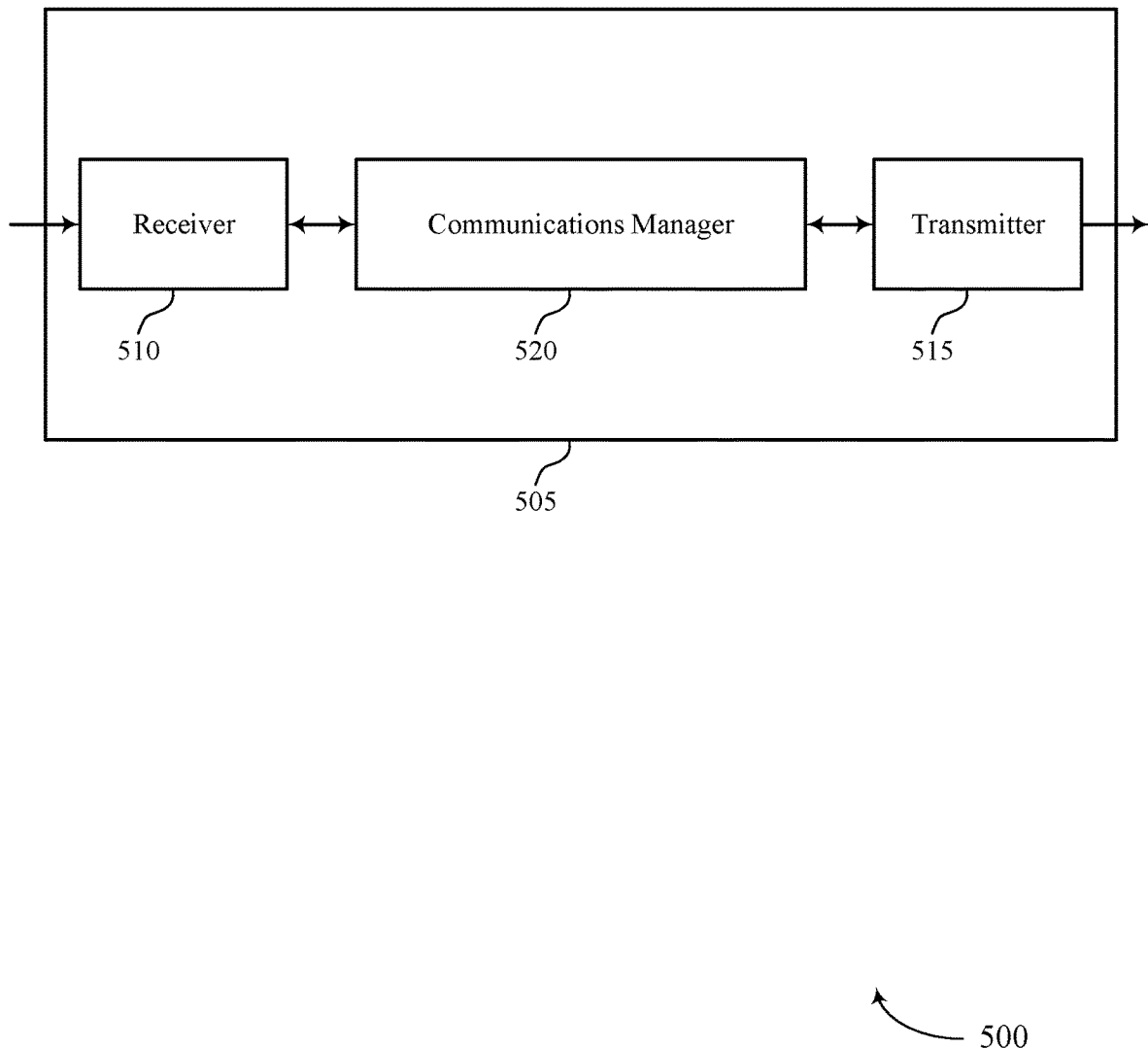
FIGS. 5 and 6 show block diagrams of devices that support techniques for GNSS positioning in accordance with aspects of the present disclosure.

FIG. 5 shows a block diagram 500 of a device 505 that supports techniques for GNSS positioning in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for GNSS positioning). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for GNSS positioning). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for GNSS positioning as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for initiating a timer based performing a position acquisition procedure using a GNSS to determine a first position of the first UE, where an expiration of the timer indicates for the first UE to perform the position acquisition procedure. The communications manager 520 may be configured as or otherwise support a means for determining, prior to the expiration of the timer, a second position of the first UE based on a relative position of the first UE to a second UE. The communications manager 520 may be configured as or otherwise support a means for resetting the timer in response to determining the second position of the first UE.

Additionally or alternatively, the communications manager 520 may support wireless communication at a UE in accordance with examples as disclosed herein. For example, the communications manager 520 may be configured as or otherwise support a means for broadcasting one or more parameters associated with the UE to a set of UEs including the UE. The communications manager 520 may be configured as or otherwise support a means for performing a position acquisition procedure based on the UE being selected from the set of UEs to perform the position acquisition procedure, where the UE is selected based on the broadcasted one or more parameters. The communications manager 520 may be configured as or otherwise support a means for communicating information associated with the position acquisition procedure.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources. For example, by supporting GNSS position determination based on a relative position to a reference UE, a frequency at which UEs perform a position acquisition procedure may be reduced, thereby reducing processing, power consumption, and resource usage associated with performing position acquisition procedures.

Figure 6:
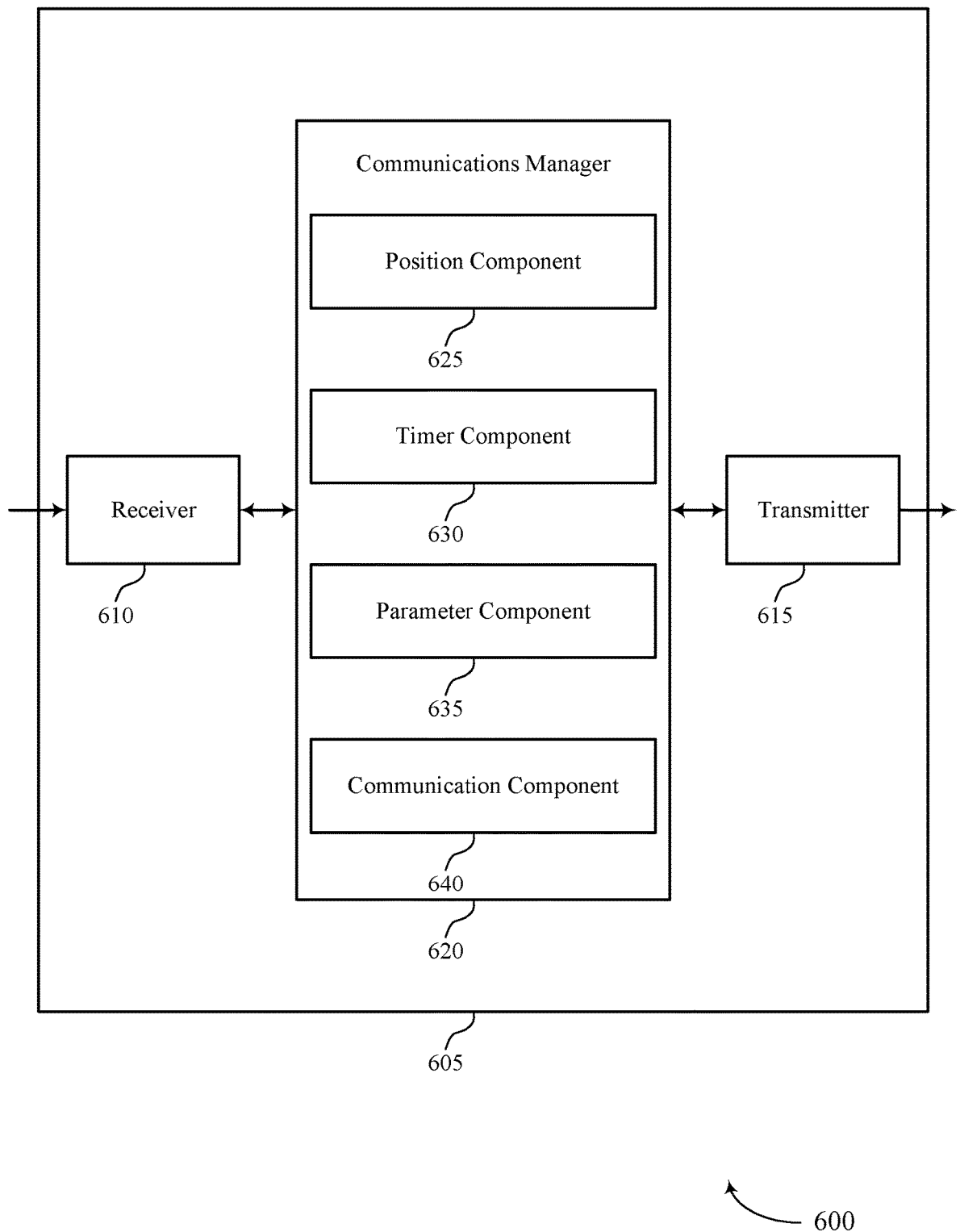

FIG. 6 shows a block diagram 600 of a device 605 that supports techniques for GNSS positioning in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for GNSS positioning). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for GNSS positioning). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for GNSS positioning as described herein. For example, the communications manager 620 may include a position component 625, a timer component 630, a parameter component 635, a communication component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The timer component 630 may be configured as or otherwise support a means for initiating a timer based performing a position acquisition procedure using a GNSS to determine a first position of the first UE, where an expiration of the timer indicates for the first UE to perform the position acquisition procedure. The position component 625 may be configured as or otherwise support a means for determining, prior to the expiration of the timer, a second position of the first UE based on a relative position of the first UE to a second UE. The timer component 630 may be configured as or otherwise support a means for resetting the timer in response to determining the second position of the first UE.

Additionally or alternatively, the communications manager 620 may support wireless communication at a UE in accordance with examples as disclosed herein. The parameter component 635 may be configured as or otherwise support a means for broadcasting one or more parameters associated with the UE to a set of UEs including the UE. The position component 625 may be configured as or otherwise support a means for performing a position acquisition procedure based on the UE being selected from the set of UEs to perform the position acquisition procedure, where the UE is selected based on the broadcasted one or more parameters. The communication component 640 may be configured as or otherwise support a means for communicating information associated with the position acquisition procedure.

Figure 7:
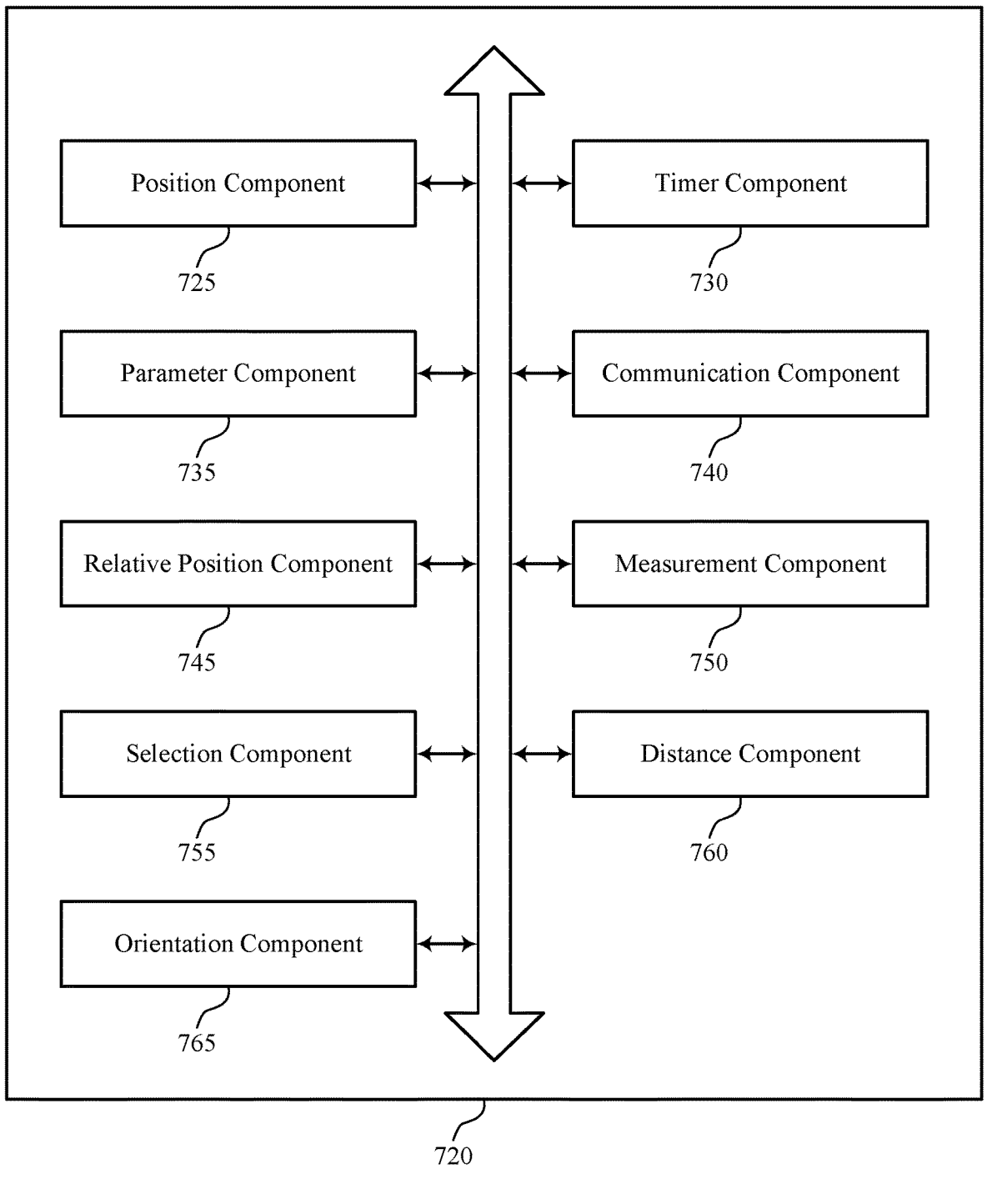
FIG. 7 shows a block diagram of a communications manager that supports techniques for GNSS positioning in accordance with aspects of the present disclosure.

FIG. 7 shows a block diagram 700 of a communications manager 720 that supports techniques for GNSS positioning in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for GNSS positioning as described herein. For example, the communications manager 720 may include a position component 725, a timer component 730, a parameter component 735, a communication component 740, a relative position component 745, a measurement component 750, a selection component 755, a distance component 760, an orientation component 765, or any combination thereof. Each of these components may communicate, directly or indirectly, with one another (e.g., via one or more buses).

The communications manager 720 may support wireless communication at a first UE in accordance with examples as disclosed herein. The timer component 730 may be configured as or otherwise support a means for initiating a timer based performing a position acquisition procedure using a GNSS to determine a first position of the first UE, where an expiration of the timer indicates for the first UE to perform the position acquisition procedure. The position component 725 may be configured as or otherwise support a means for determining, prior to the expiration of the timer, a second position of the first UE based on a relative position of the first UE to a second UE. The timer component 730 may be configured as or otherwise support a means for resetting the timer in response to determining the second position of the first UE.

In some examples, the second UE is selected from a set of UEs including the first UE and the second UE to perform a second position acquisition procedure using the GNSS, the second position of the first UE determined based on the second UE being selected from the set of UEs to perform the second position acquisition procedure.

In some examples, the relative position component 745 may be configured as or otherwise support a means for calculating the relative position of the first UE to the second UE based on a previous position of the first UE and a position of the second UE at a time of the previous position of the first UE.

In some examples, the measurement component 750 may be configured as or otherwise support a means for transmitting, to a network, the second UE, or a third UE of a set of UEs including the first UE, the second UE, and the third UE, a set of measurements including an RTT associated with communications between the first UE and the second UE, a time of flight associated with the communications between the first UE and the second UE, an angle of arrival associated with the communications between the first UE and the second UE, or a combination thereof. In some examples, the relative position component 745 may be configured as or otherwise support a means for receiving, from the network, the second UE, or the third UE, an indication of the relative position of the first UE to the second UE based on the set of measurements.

In some examples, the relative position component 745 may be configured as or otherwise support a means for calculating the relative position of the first UE to the second UE based on a distance from the first UE to the second UE, an orientation of a vehicle on which the first UE and the second UE are located, or a combination thereof.

In some examples, the distance component 760 may be configured as or otherwise support a means for determining the distance from the first UE to the second UE based on an RTT associated with communications between the first UE and the second UE or a time of flight associated with the communications between the first UE and the second UE.

In some examples, the orientation component 765 may be configured as or otherwise support a means for receiving, from the second UE or a third UE of a set of UEs including the first UE, the second UE, and the third UE, an indication of the orientation of the vehicle.

In some examples, the relative position of the first UE to the second UE for determining the second position of the first UE is configured to be a null distance. In some examples, to support determining the second position of the first UE, the position component 725 may be configured as or otherwise support a means for determining that the second position of the first UE corresponds to a position of the second UE based on the relative position of the first UE to the second UE being configured to be the null distance.

In some examples, to support determining the position of the first UE, the position component 725 may be configured as or otherwise support a means for calculating the second position of the first UE based on a position of the second UE and the relative position of the first UE to the second UE.

In some examples, the position component 725 may be configured as or otherwise support a means for receiving, from a network, the second UE, or a third UE of a set of UEs including the first UE, the second UE, and the third UE, an indication of the position of the second UE.

In some examples, the position component 725 may be configured as or otherwise support a means for receiving, from a network, the second UE, or a third UE of a set of UEs including the first UE, the second UE, and the third UE, an indication of the second position of the first UE, where determining the second position of the first UE is based on receiving the indication.

In some examples, the parameter component 735 may be configured as or otherwise support a means for transmitting, to a network, a first set of parameters including an SNR of a signal received from the GNSS, a remaining battery power of the first UE, one or more pathloss values associated with communicating with a set of UEs including the first UE and the second UE, or a combination thereof. In some examples, the selection component 755 may be configured as or otherwise support a means for receiving, from the network, an indication that the second UE is selected from the set of UEs to perform a second position acquisition procedure using the GNSS based on the first set of parameters.

In some examples, the parameter component 735 may be configured as or otherwise support a means for broadcasting, to a set of UEs including the first UE and the second UE, a first indication of a first set of parameters including an SNR of a first signal received at the first UE from the GNSS, a remaining battery power of the first UE, one or more pathloss values from the first UE to the set of UEs, or a combination thereof. In some examples, the parameter component 735 may be configured as or otherwise support a means for receiving, from one or more UEs of the set of UEs including at least the second UE, one or more second indications of one or more second sets of parameters including an SNR of a second signal received at a respective UE of the one or more UEs from the GNSS, a remaining battery power of the respective UE, one or more pathloss values from the respective UE to the set of UEs, or a combination thereof. In some examples, the selection component 755 may be configured as or otherwise support a means for selecting the second UE to perform a second position acquisition procedure using the GNSS based on the first set of parameters and the one or more second sets of parameters.

In some examples, the position component 725 may be configured as or otherwise support a means for determining, after resetting the timer, a third position of the first UE based on: a second relative position of the first UE to a third UE of a set of UEs including the first UE, the second UE, and the third UE, and the third UE being selected from the set of UEs to perform a second position acquisition procedure using the GNSS. In some examples, the timer component 730 may be configured as or otherwise support a means for resetting the timer in response to determining the second position of the first UE.

In some examples, the position component 725 may be configured as or otherwise support a means for performing a second position acquisition procedure using the GNSS to determine a third position of the first UE based on an expiration of a second timer, where the timer has a first duration shorter than a second duration of the second timer.

In some examples, the communication component 740 may be configured as or otherwise support a means for transmitting an uplink message to a network, where a time compensation, a frequency compensation, or a combination thereof, associated with transmitting the uplink message is based on the second position of the first UE determined based on the relative position of the first UE to the second UE.

Additionally or alternatively, the communications manager 720 may support wireless communication at a UE in accordance with examples as disclosed herein. The parameter component 735 may be configured as or otherwise support a means for broadcasting one or more parameters associated with the UE to a set of UEs including the UE. In some examples, the position component 725 may be configured as or otherwise support a means for performing a position acquisition procedure based on the UE being selected from the set of UEs to perform the position acquisition procedure, where the UE is selected based on the broadcasted one or more parameters. The communication component 740 may be configured as or otherwise support a means for communicating information associated with the position acquisition procedure.

In some examples, to support performing the position acquisition procedure, the position component 725 may be configured as or otherwise support a means for determining a position of the UE using signals transmitted from a GNSS.

In some examples, the communication component 740 may be configured as or otherwise support a means for determining, based on the position of the UE, a time compensation, a frequency compensation, or a combination thereof, associated with transmitting uplink messages to one or more non-terrestrial base stations.

In some examples, to support performing the position acquisition procedure, the position component 725 may be configured as or otherwise support a means for establishing a connection with a network, and receiving, from a location server of the network, an indication of a position of the UE based on establishing the connection.

In some examples, a second UE of the set of UEs includes the location server, and the indication of the position of the UE is received from the second UE.

In some examples, to support communicating the information associated with the position acquisition procedure, the communication component 740 may be configured as or otherwise support a means for broadcasting a position of the UE to the set of UEs.

In some examples, the parameter component 735 may be configured as or otherwise support a means for receiving, from one or more UEs of the set of UEs, one or more indications of one or more sets of parameters including an SNR ratio of a signal received at a respective UE of the one or more UEs from a GNSS, a remaining battery power of the respective UE, one or more pathloss values from the respective UE to the set of UEs, or a combination thereof. In some examples, the selection component 755 may be configured as or otherwise support a means for selecting the UE to perform the position acquisition procedure based on the one or more parameters and the one or more sets of parameters.

In some examples, the one or more parameters include an SNR of a first signal received at the UE from a GNSS, a remaining battery power of the UE, one or more pathloss values from the UE to the set of UEs, or a combination thereof.

Figure 8:
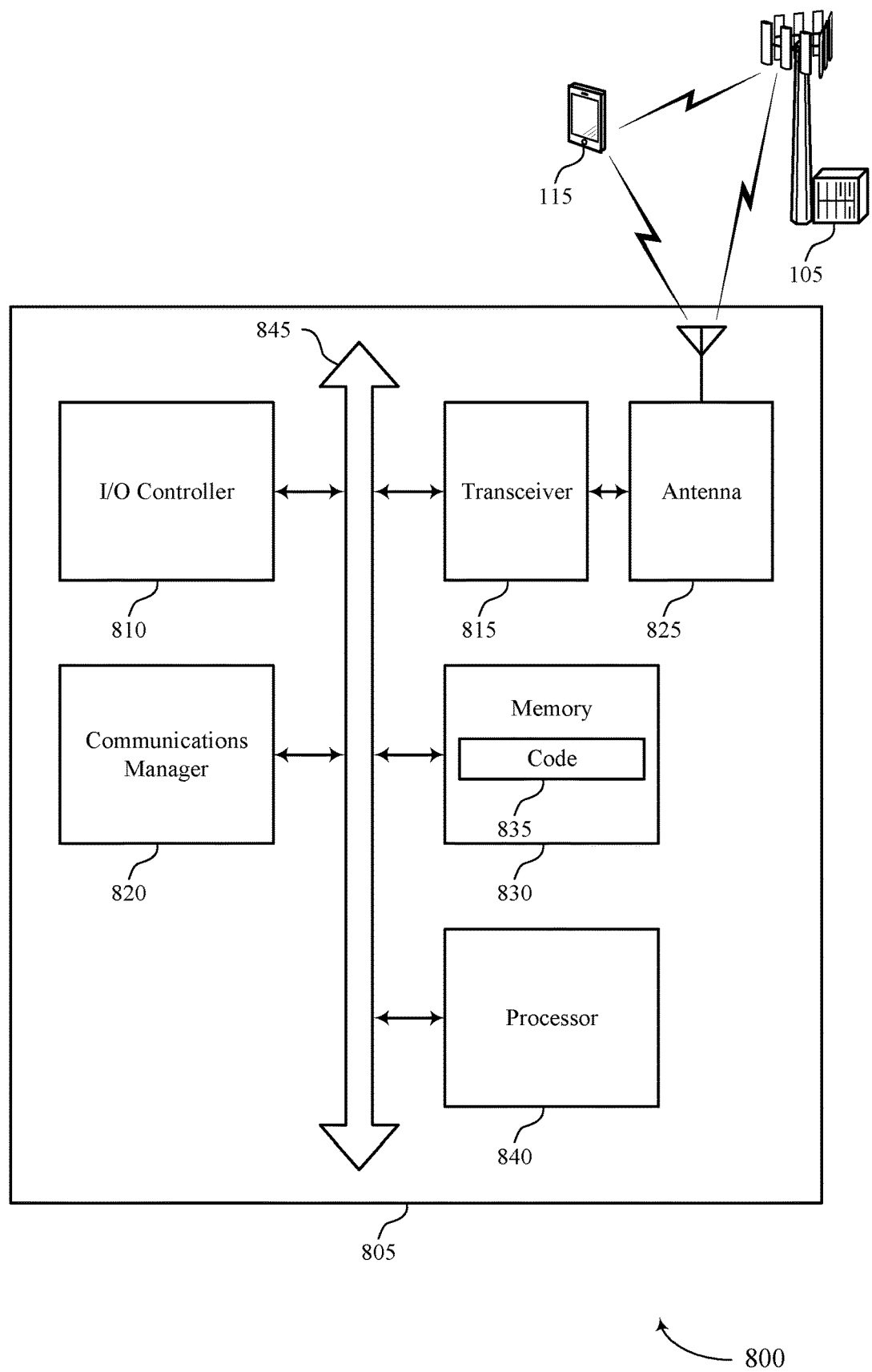
FIG. 8 shows a diagram of a system including a device that supports techniques for GNSS positioning in accordance with aspects of the present disclosure.

FIG. 8 shows a diagram of a system 800 including a device 805 that supports techniques for GNSS positioning in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for GNSS positioning). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for initiating a timer based on performing a position acquisition procedure using a GNSS to determine a first position of the first UE, where an expiration of the timer indicates for the first UE to perform the position acquisition procedure. The communications manager 820 may be configured as or otherwise support a means for determining, prior to expiration of the timer, a second position of the first UE based on a relative position of the first UE to a second UE. The communications manager 820 may be configured as or otherwise support a means for resetting the timer in response to determining the second position of the first UE.

Additionally or alternatively, the communications manager 820 may support wireless communication at a UE in accordance with examples as disclosed herein. For example, the communications manager 820 may be configured as or otherwise support a means for broadcasting one or more parameters associated with the UE to a set of UEs including the UE. The communications manager 820 may be configured as or otherwise support a means for performing a position acquisition procedure based on the UE being selected from the set of UEs to perform the position acquisition procedure, where the UE is selected based on the broadcasted one or more parameters. The communications manager 820 may be configured as or otherwise support a means for communicating information associated with the position acquisition procedure.

By including or configuring the communications manager 820 in accordance with examples as described herein, the device 805 may support techniques for improved power consumption, battery life, processing capability, coordination between devices, and resource utilization efficiency, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for GNSS positioning as described herein, or the processor 840 and the memory 830 may be otherwise configured to perform or support such operations.

Figure 9:
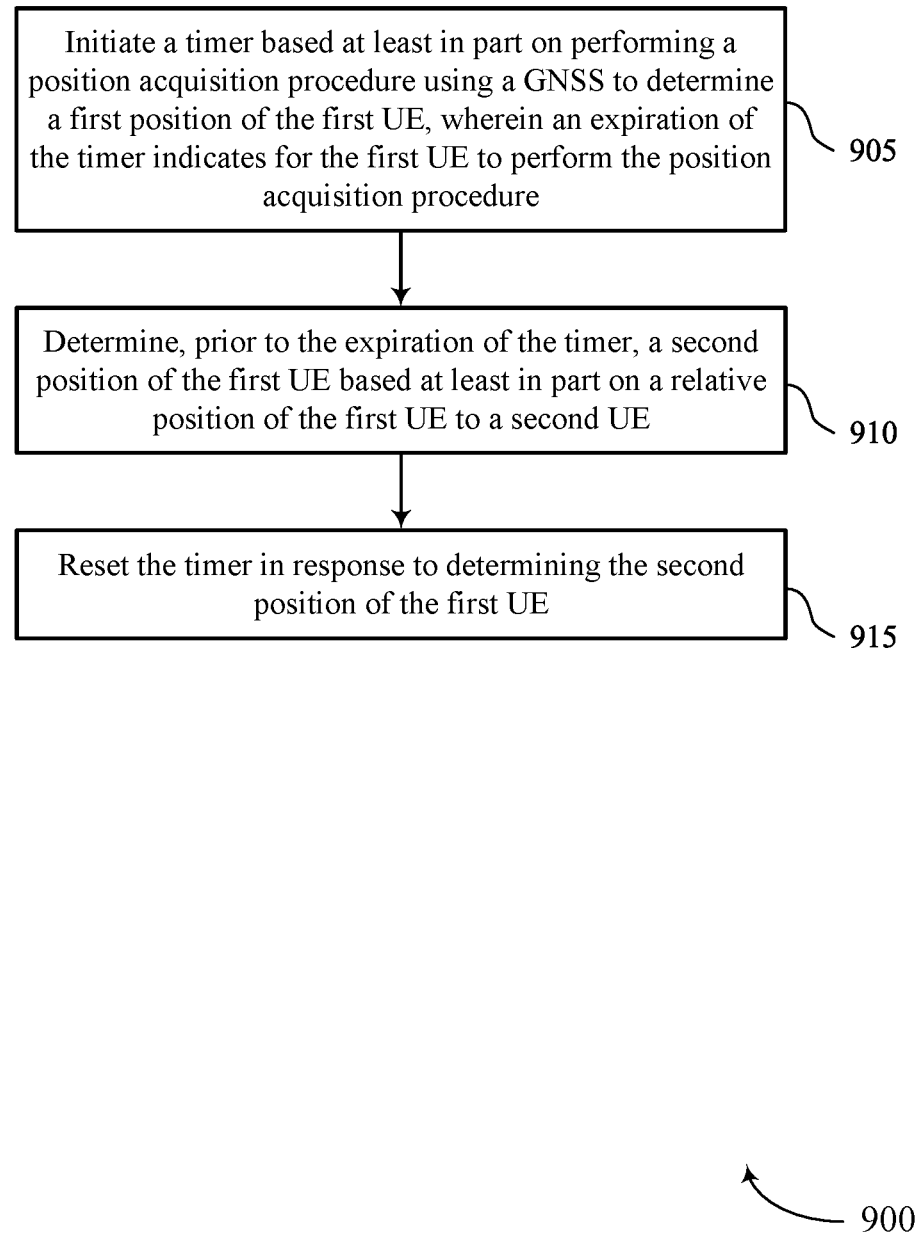
FIGS. 9 through 14 show flowcharts illustrating methods that support techniques for GNSS positioning in accordance with aspects of the present disclosure.

FIG. 9 shows a flowchart illustrating a method 900 that supports techniques for GNSS positioning in accordance with aspects of the present disclosure. The operations of the method 900 may be implemented by a first UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include initiating a timer based on performing a position acquisition procedure using a GNSS to determine a first position of the first UE, where an expiration of the timer indicates for the first UE to perform the position acquisition procedure. The operations of 905 may be performed in accordance with examples as disclosed herein. In some examples, aspects of the operations of 905 may be performed by a timer component 730 as described with reference to FIG. 7.

At 910, the method may include determining, prior to expiration of the timer, a second position of the first UE based on a relative position of the first UE to a second UE. The operations of 910 may be performed in accordance with examples as disclosed herein. In some examples, aspects of the operations of 910 may be performed by a position component 725 as described with reference to FIG. 7.

At 915, the method may include resetting the timer in response to determining the second position of the first UE. The operations of 915 may be performed in accordance with examples as disclosed herein. In some examples, aspects of the operations of 915 may be performed by a timer component 730 as described with reference to FIG. 7.

Figure 10:
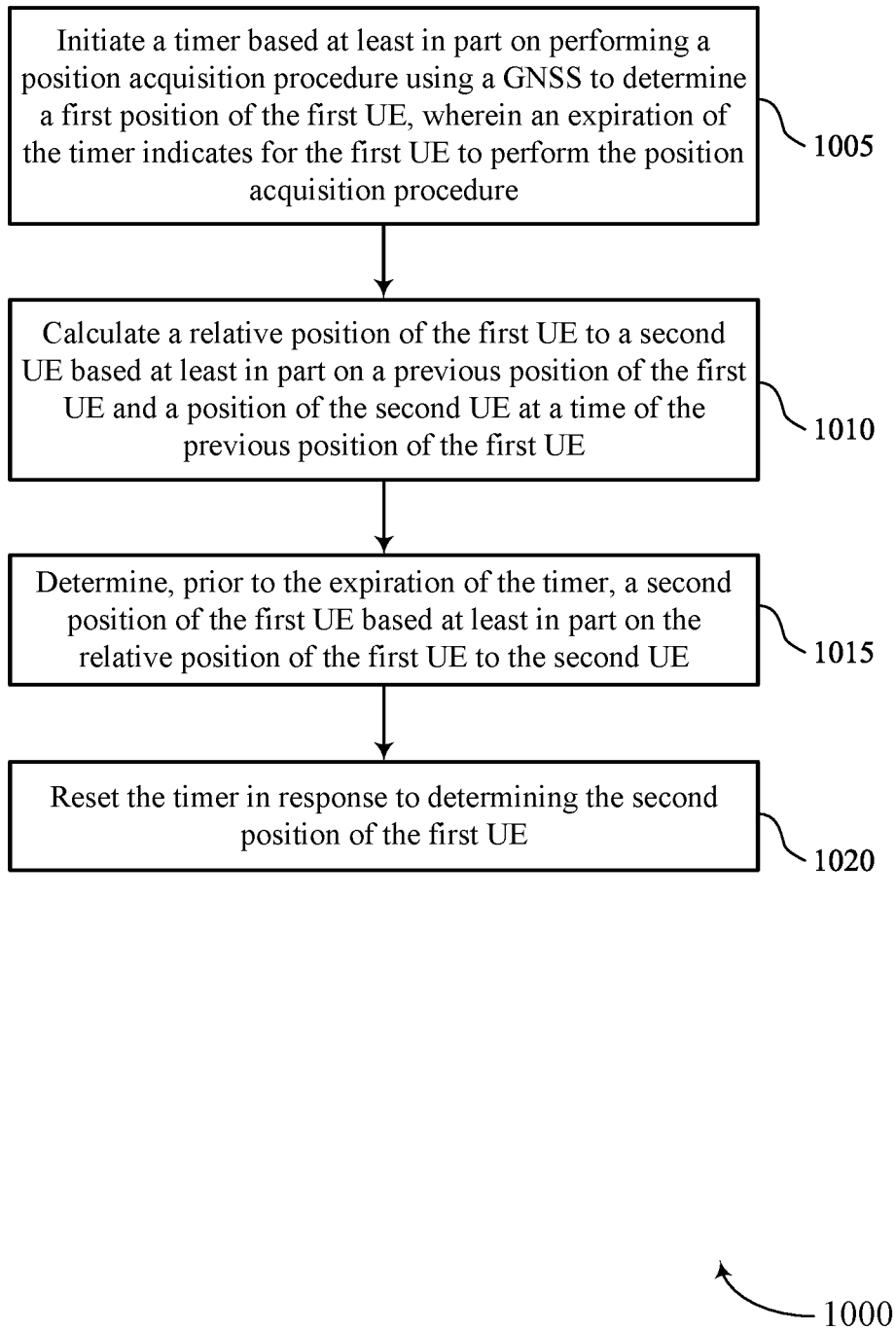

FIG. 10 shows a flowchart illustrating a method 1000 that supports techniques for GNSS positioning in accordance with aspects of the present disclosure. The operations of the method 1000 may be implemented by a first UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include initiating a timer based on performing a position acquisition procedure using a GNSS to determine a first position of the first UE, where an expiration of the timer indicates for the first UE to perform the position acquisition procedure. The operations of 1005 may be performed in accordance with examples as disclosed herein. In some examples, aspects of the operations of 1005 may be performed by a timer component 730 as described with reference to FIG. 7.

At 1010, the method may include calculating a relative position of the first UE to a second UE based on a previous position of the first UE and a position of the second UE at a time of the previous position of the first UE. The operations of 1010 may be performed in accordance with examples as disclosed herein. In some examples, aspects of the operations of 1010 may be performed by a relative position component 745 as described with reference to FIG. 7.

At 1015, the method may include determining, prior to the expiration of the timer, a second position of the first UE based on the relative position of the first UE to the second UE, where the second UE is selected from a set of UEs including the first UE and the second UE to perform a position acquisition procedure using a GNSS. The operations of 1015 may be performed in accordance with examples as disclosed herein. In some examples, aspects of the operations of 1015 may be performed by a position component 725 as described with reference to FIG. 7.

At 1020, the method may include resetting the timer in response to determining the second position of the first UE. The operations of 1020 may be performed in accordance with examples as disclosed herein. In some examples, aspects of the operations of 1020 may be performed by a timer component 730 as described with reference to FIG. 7.

Figure 11:
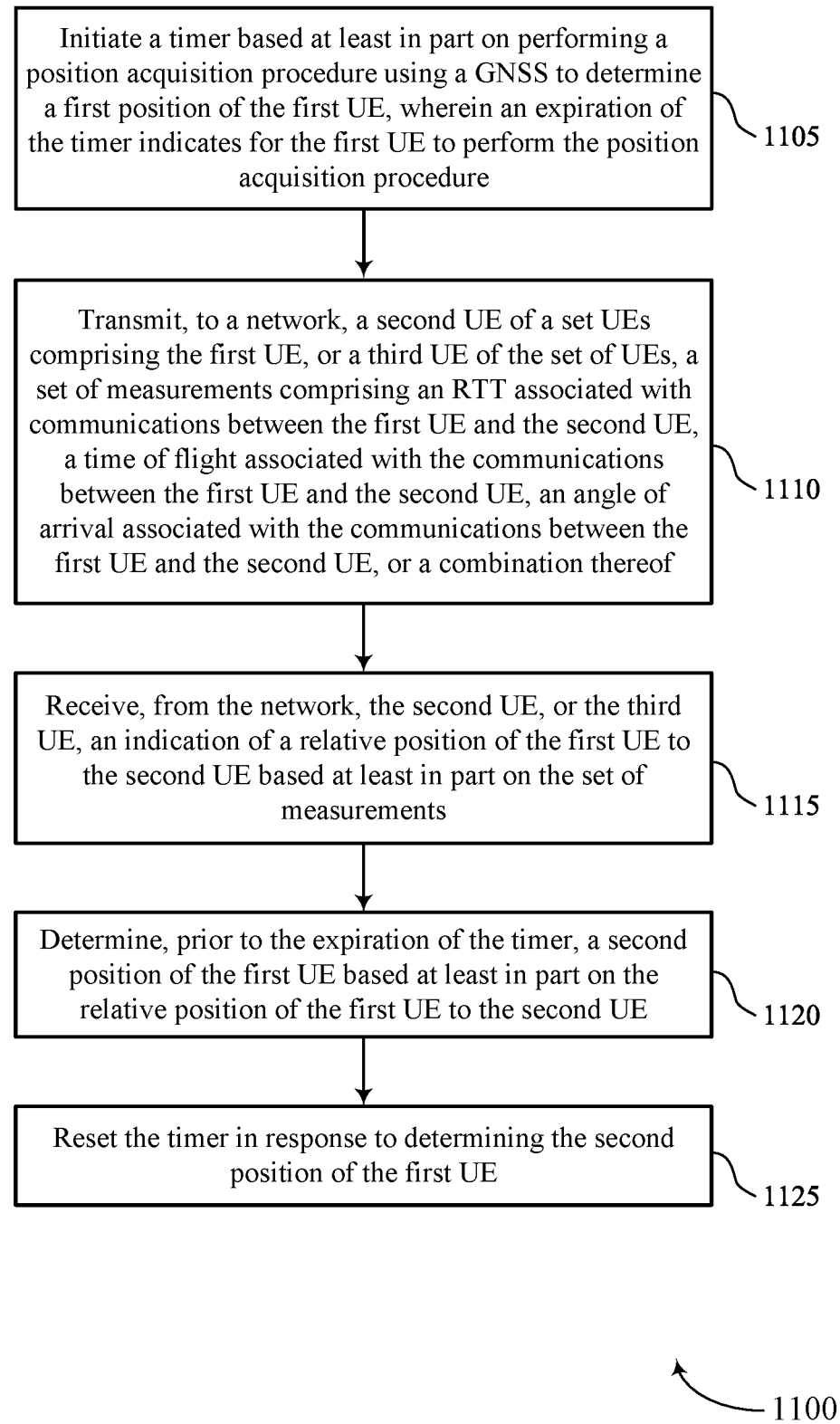

FIG. 11 shows a flowchart illustrating a method 1100 that supports techniques for GNSS positioning in accordance with aspects of the present disclosure. The operations of the method 1100 may be implemented by a first UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include initiating a timer based on performing a position acquisition procedure using a GNSS to determine a first position of the first UE, where an expiration of the timer indicates for the first UE to perform the position acquisition procedure. The operations of 1105 may be performed in accordance with examples as disclosed herein. In some examples, aspects of the operations of 1105 may be performed by a timer component 730 as described with reference to FIG. 7.

At 1110, the method may include transmitting, to a network, a second UE of a set UEs including the first UE, or a third UE of the set of UEs, a set of measurements including an RTT associated with communications between the first UE and the second UE, a time of flight associated with the communications between the first UE and the second UE, an angle of arrival associated with the communications between the first UE and the second UE, or a combination thereof. The operations of 1110 may be performed in accordance with examples as disclosed herein. In some examples, aspects of the operations of 1110 may be performed by a measurement component 750 as described with reference to FIG. 7.

At 1115, the method may include receiving, from the network, the second UE, or the third UE, an indication of a relative position of the first UE to the second UE based on the set of measurements. The operations of 1115 may be performed in accordance with examples as disclosed herein. In some examples, aspects of the operations of 1115 may be performed by a relative position component 745 as described with reference to FIG. 7.

At 1120, the method may include determining, prior to the expiration of the timer, a second position of the first UE based on the relative position of the first UE to the second UE. The operations of 1120 may be performed in accordance with examples as disclosed herein. In some examples, aspects of the operations of 1120 may be performed by a position component 725 as described with reference to FIG. 7.

At 1125, the method may include resetting the timer in response to determining the second position of the first UE. The operations of 1125 may be performed in accordance with examples as disclosed herein. In some examples, aspects of the operations of 1125 may be performed by a timer component 730 as described with reference to FIG. 7.

Figure 12:
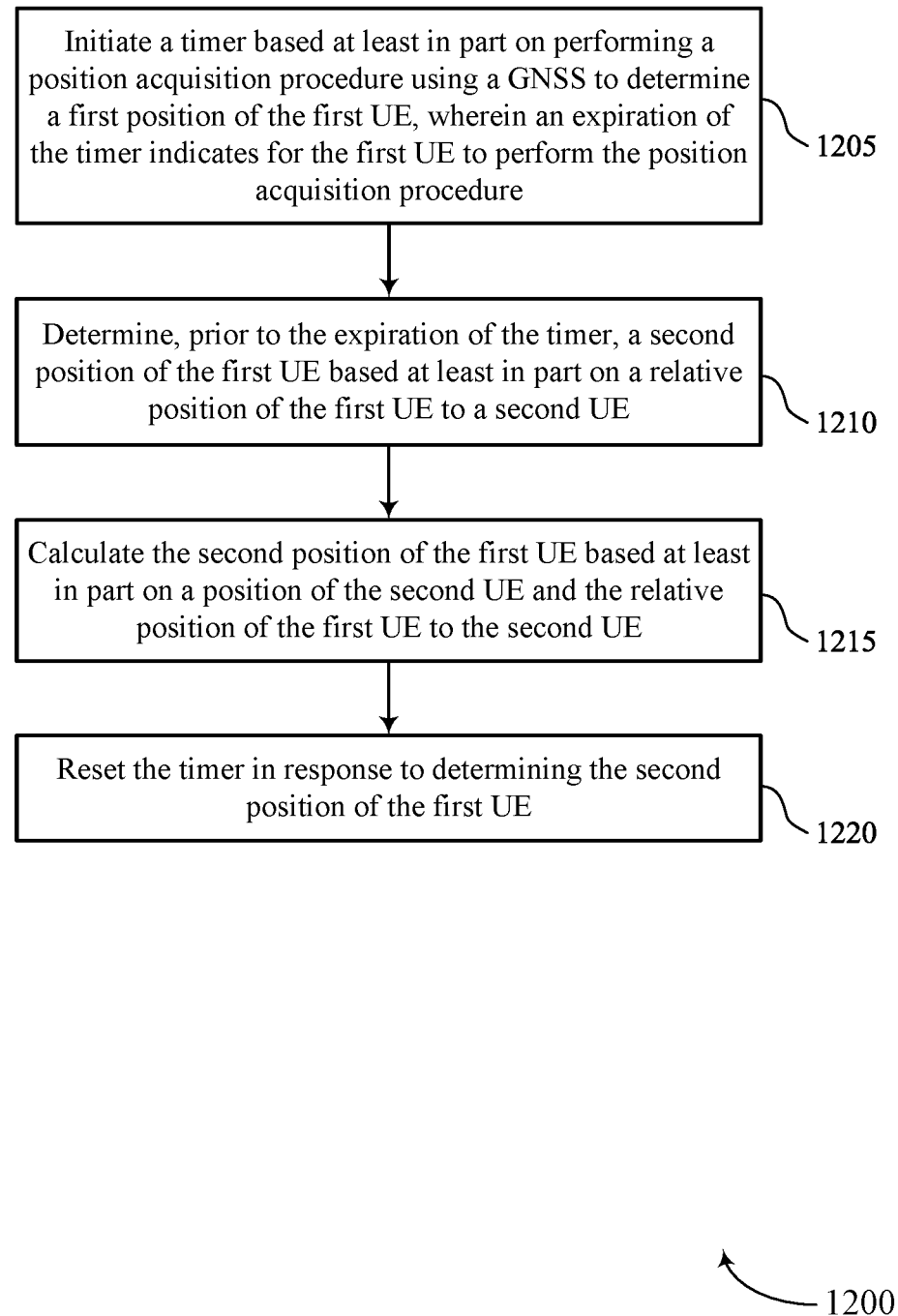

FIG. 12 shows a flowchart illustrating a method 1200 that supports techniques for GNSS positioning in accordance with aspects of the present disclosure. The operations of the method 1200 may be implemented by a first UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include initiating a timer based on performing a position acquisition procedure using a GNSS to determine a first position of the first UE, where an expiration of the timer indicates for the first UE to perform the position acquisition procedure. The operations of 1205 may be performed in accordance with examples as disclosed herein. In some examples, aspects of the operations of 1205 may be performed by a timer component 730 as described with reference to FIG. 7.

At 1210, the method may include determining, prior to the expiration of the timer, a second position of the first UE based on a relative position of the first UE to a second UE. The operations of 1210 may be performed in accordance with examples as disclosed herein. In some examples, aspects of the operations of 1210 may be performed by a position component 725 as described with reference to FIG. 7.

At 1215, to determine the second position of the first UE, the method may include calculating the second position of the first UE based on a position of the second UE and the relative position of the first UE to the second UE. The operations of 1215 may be performed in accordance with examples as disclosed herein. In some examples, aspects of the operations of 1215 may be performed by a position component 725 as described with reference to FIG. 7.

At 1220, the method may include resetting the timer in response to determining the second position of the first UE. The operations of 1220 may be performed in accordance with examples as disclosed herein. In some examples, aspects of the operations of 1220 may be performed by a timer component 730 as described with reference to FIG. 7.

Figure 13:
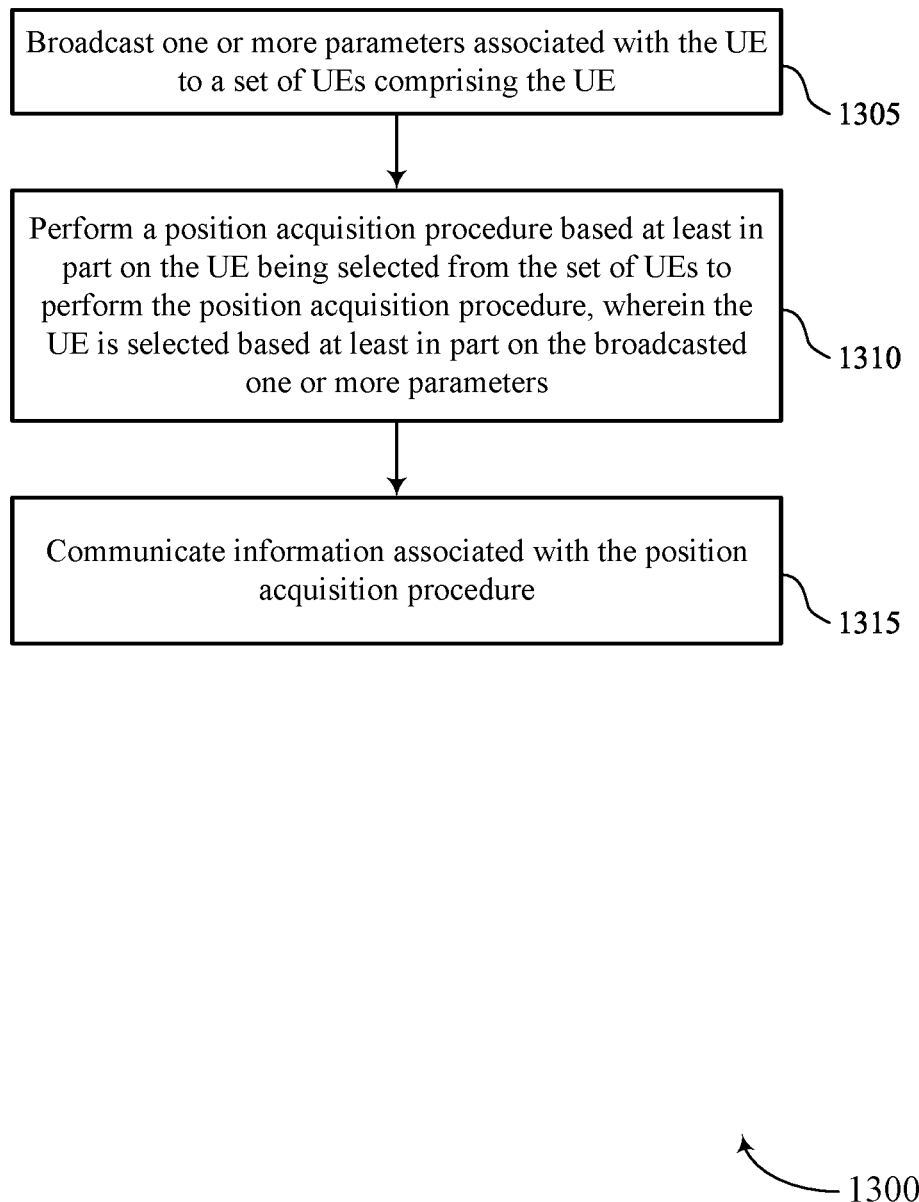

FIG. 13 shows a flowchart illustrating a method 1300 that supports techniques for GNSS positioning in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include broadcasting one or more parameters associated with the UE to a set of UEs including the UE. The operations of 1305 may be performed in accordance with examples as disclosed herein. In some examples, aspects of the operations of 1305 may be performed by a parameter component 735 as described with reference to FIG. 7.

At 1310, the method may include performing a position acquisition procedure based on the UE being selected from the set of UEs to perform the position acquisition procedure, where the UE is selected based on the broadcasted one or more parameters. The operations of 1310 may be performed in accordance with examples as disclosed herein. In some examples, aspects of the operations of 1310 may be performed by a position component 725 as described with reference to FIG. 7.

At 1315, the method may include communicating information associated with the position acquisition procedure. The operations of 1315 may be performed in accordance with examples as disclosed herein. In some examples, aspects of the operations of 1315 may be performed by a communication component 740 as described with reference to FIG. 7.

Figure 14:
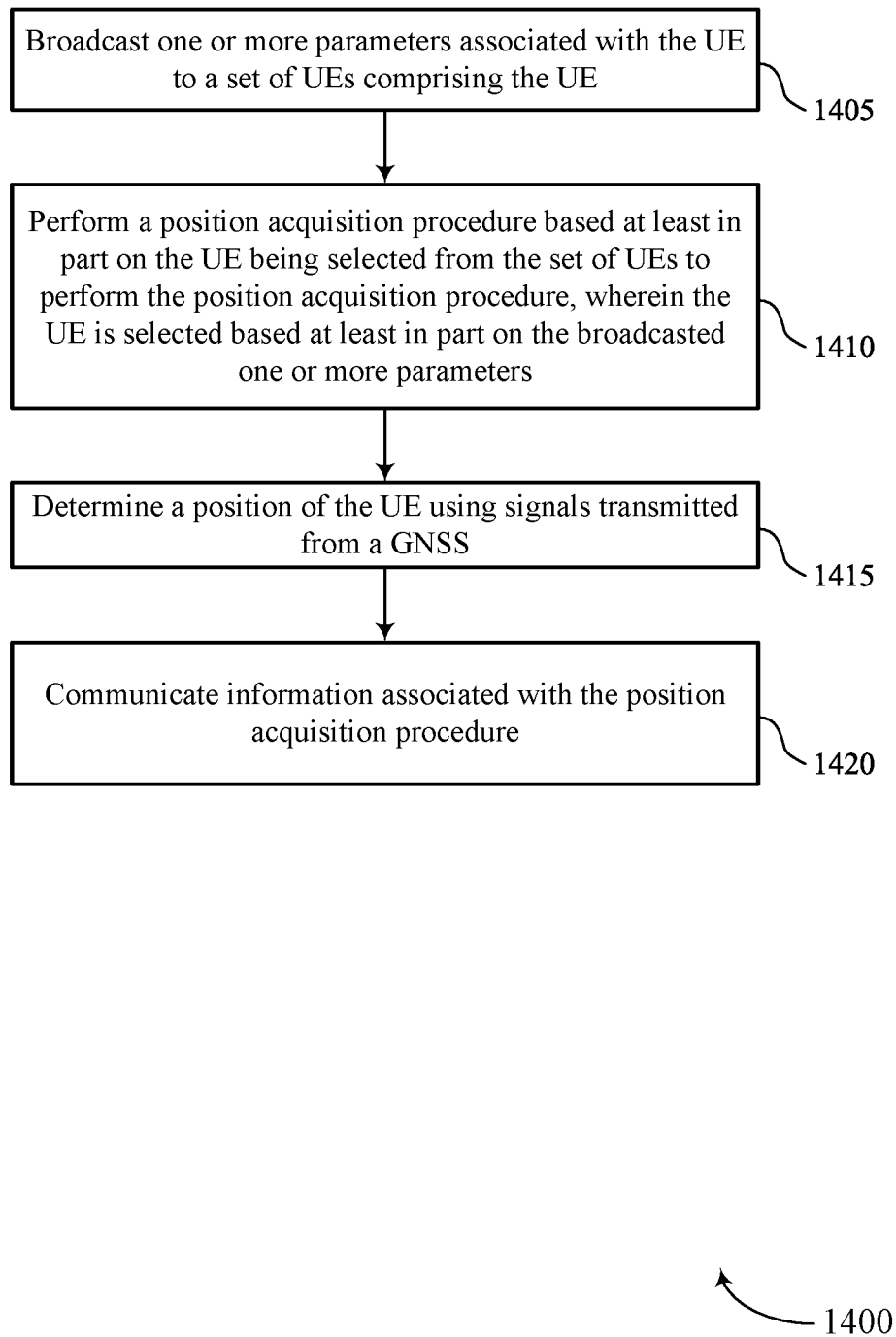

FIG. 14 shows a flowchart illustrating a method 1400 that supports techniques for GNSS positioning in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include broadcasting one or more parameters associated with the UE to a set of UEs including the UE. The operations of 1405 may be performed in accordance with examples as disclosed herein. In some examples, aspects of the operations of 1405 may be performed by a parameter component 735 as described with reference to FIG. 7.

At 1410, the method may include performing a position acquisition procedure based on the UE being selected from the set of UEs to perform the position acquisition procedure, where the UE is selected based on the broadcasted one or more parameters. The operations of 1410 may be performed in accordance with examples as disclosed herein. In some examples, aspects of the operations of 1410 may be performed by a position component 725 as described with reference to FIG. 7.

At 1415, to perform the position acquisition procedure, the method may include determining a position of the UE using signals transmitted from a GNSS. The operations of 1415 may be performed in accordance with examples as disclosed herein. In some examples, aspects of the operations of 1415 may be performed by a position component 725 as described with reference to FIG. 7.

At 1420, the method may include communicating information associated with the position acquisition procedure. The operations of 1420 may be performed in accordance with examples as disclosed herein. In some examples, aspects of the operations of 1420 may be performed by a communication component 740 as described with reference to FIG. 7.

The following provides an overview of aspects of the present disclosure:

Aspect 1: A method for wireless communication at a first UE, comprising: initiating a timer based at least in part on performing a position acquisition procedure using a GNSS to determine a first position of the first UE, wherein an expiration of the timer indicates for the first UE to perform the position acquisition procedure; determining, prior to the expiration of the timer, a second position of the first UE based at least in part on a relative position of the first UE to a second UE; and resetting the timer in response to determining the second position of the first UE.

Aspect 2: The method of aspect 1, wherein the second UE is selected from a set of UEs comprising the first UE and the second UE to perform a second position acquisition procedure using the GNSS, the second position of the first UE determined based at least in part on the second UE being selected from the set of UEs to perform the second position acquisition procedure.

Aspect 3: The method of any of aspects 1 through 2, further comprising: calculating the relative position of the first UE to the second UE based at least in part on a previous position of the first UE and a position of the second UE at a time of the previous position of the first UE.

Aspect 4: The method of any of aspects 1 through 2, further comprising: transmitting, to a network, the second UE, or a third UE of a set of UEs comprising the first UE, the second UE, and the third UE, a set of measurements comprising an RTT associated with communications between the first UE and the second UE, a time of flight associated with the communications between the first UE and the second UE, an angle of arrival associated with the communications between the first UE and the second UE, or a combination thereof; and receiving, from the network, the second UE, or the third UE, an indication of the relative position of the first UE to the second UE based at least in part on the set of measurements.

Aspect 5: The method of any of aspects 1 through 2, further comprising: calculating the relative position of the first UE to the second UE based at least in part on a distance from the first UE to the second UE, an orientation of a vehicle on which the first UE and the second UE are located, or a combination thereof.

Aspect 6: The method of aspect 5, further comprising: determining the distance from the first UE to the second UE based at least in part on an RTT associated with communications between the first UE and the second UE or a time of flight associated with the communications between the first UE and the second UE.

Aspect 7: The method of any of aspects 5 through 6, further comprising: receiving, from the second UE or a third UE of a set of UEs comprising the first UE, the second UE, and the third UE, an indication of the orientation of the vehicle.

Aspect 8: The method of aspect 1, wherein the relative position of the first UE to the second UE for determining the second position of the first UE is configured to be a null distance, wherein determining the second position of the first UE comprises: determining that the second position of the first UE corresponds to a position of the second UE based at least in part on the relative position of the first UE to the second UE being configured to be the null distance.

Aspect 9: The method of any of aspects 1 through 8, wherein determining the second position of the first UE comprises: calculating the position of the first UE based at least in part on a position of the second UE and the relative position of the first UE to the second UE.

Aspect 10: The method of aspect 9, further comprising: receiving, from a network, the second UE, or a third UE of a set of UEs comprising the first UE, the second UE, and the third UE, an indication of the position of the second UE.

Aspect 11: The method of any of aspects 1 through 8, further comprising: receiving, from a network, the second UE, or a third UE of a set of UEs comprising the first UE, the second UE, and the third UE, an indication of the position of the first UE, wherein determining the second position of the first UE is based at least in part on receiving the indication.

Aspect 12: The method of any of aspects 1 through 11, further comprising: transmitting, to a network, a first set of parameters comprising an SNR of a signal received from the GNSS, a remaining battery power of the first UE, one or more pathloss values associated with communicating with a set of UEs comprising the first UE and the second UE, or a combination thereof; and receiving, from the network, an indication that the second UE is selected from the set of UEs to perform a second position acquisition procedure using the GNSS based at least in part on the first set of parameters.

Aspect 13: The method of any of aspects 1 through 11, further comprising: broadcasting, to a set of UEs comprising the first UE and the second UE, a first indication of a first set of parameters comprising an SNR of a first signal received at the first UE from the GNSS, a remaining battery power of the first UE, one or more pathloss values from the first UE to the set of UEs, or a combination thereof; receiving, from one or more UEs of the set of UEs including at least the second UE, one or more second indications of one or more second sets of parameters comprising an SNR of a second signal received at a respective UE of the one or more UEs from the GNSS, a remaining battery power of the respective UE, one or more pathloss values from the respective UE to the set of UEs, or a combination thereof; and selecting the second UE to perform a second position acquisition procedure using the GNSS based at least in part on the first set of parameters and the one or more second sets of parameters.

Aspect 14: The method of any of aspects 1 through 13, further comprising: determining, after resetting the timer, a third position of the first UE based at least in part on: a second relative position of the first UE to a third UE of a set of UEs comprising the first UE, the second UE, and the third UE, and the third UE being selected from the set of UEs to perform a second position acquisition procedure using the GNSS; and resetting the timer in response to determining the second position of the first UE.

Aspect 15: The method of any of aspects 1 through 14, further comprising: performing a second position acquisition procedure using the GNSS to determine a third position of the first UE based at least in part on an expiration of a second timer, wherein the timer has a first duration shorter than a second duration of the second timer.

Aspect 16: The method of any of aspects 1 through 15, further comprising: transmitting an uplink message to a network, wherein a time compensation, a frequency compensation, or a combination thereof, associated with transmitting the uplink message is based at least in part on the second position of the first UE determined based at least in part on the relative position of the first UE to the second UE.

Aspect 17: A method for wireless communication at a UE, comprising: broadcasting one or more parameters associated with the UE to a set of UEs comprising the UE; and performing a position acquisition procedure based at least in part on the UE being selected from the set of UEs to perform the position acquisition procedure, wherein the UE is selected based at least in part on the broadcasted one or more parameters; and communicating information associated with the position acquisition procedure.

Aspect 18: The method of aspect 17, wherein performing the position acquisition procedure comprises: determining a position of the UE using signals transmitted from a GNSS.

Aspect 19: The method of aspect 18, further comprising: determining, based at least in part on the position of the UE, a time compensation, a frequency compensation, or a combination thereof, associated with transmitting uplink messages to one or more non-terrestrial base stations.

Aspect 20: The method of aspect 17, wherein performing the position acquisition procedure comprises: establishing a connection with a network; and receiving, from a location server of the network, an indication of a position of the UE based at least in part on establishing the connection.

Aspect 21: The method of aspect 20, wherein a second UE of the set of UEs comprises the location server, and the indication of the position of the UE is received from the second UE.

Aspect 22: The method of any of aspects 17 through 21, wherein communicating the information associated with the position acquisition procedure comprises: broadcasting a position of the UE to the set of UEs.

Aspect 23: The method of any of aspects 17 through 22, further comprising: receiving, from one or more UEs of the set of UEs, one or more indications of one or more sets of parameters comprising an SNR of a signal received at a respective UE of the one or more UEs from a GNSS, a remaining battery power of the respective UE, one or more pathloss values from the respective UE to the set of UEs, or a combination thereof and selecting the UE to perform the position acquisition procedure based at least in part on the one or more parameters and the one or more sets of parameters.

Aspect 24: The method of any of aspects 17 through 23, wherein the one or more parameters comprise an SNR of a first signal received at the UE from a GNSS, a remaining battery power of the UE, one or more pathloss values from the UE to the set of UEs, or a combination thereof Aspect 25: An apparatus for wireless communication at a first UE, comprising a processor; memory coupled with the processor; and instructions stored in the memory and executable by the processor to cause the apparatus to perform a method of any of aspects 1 through 16.

Aspect 26: An apparatus for wireless communication at a first UE, comprising at least one means for performing a method of any of aspects 1 through 16.

Aspect 27: A non-transitory computer-readable medium storing code for wireless communication at a first UE, the code comprising instructions executable by a processor to perform a method of any of aspects 1 through 16.

Aspect 28: An apparatus for wireless communication at a UE, comprising a processor; memory coupled with the processor; and instructions stored in the memory and executable by the processor to cause the apparatus to perform a method of any of aspects 17 through 24.

Aspect 29: An apparatus for wireless communication at a UE, comprising at least one means for performing a method of any of aspects 17 through 24.

Aspect 30: A non-transitory computer-readable medium storing code for wireless communication at a UE, the code comprising instructions executable by a processor to perform a method of any of aspects 17 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    initiating a timer based at least in part on performing a position acquisition procedure using a global navigation satellite system to determine a first position of the first UE, wherein an expiration of the timer indicates for the first UE to perform the position acquisition procedure;
    determining, prior to the expiration of the timer, a second position of the first UE based at least in part on a relative position of the first UE to a second UE; and
    resetting the timer in response to determining the second position of the first UE.

2. The method of claim 1, wherein the second UE is selected from a set of UEs comprising the first UE and the second UE to perform a second position acquisition procedure using the global navigation satellite system, the second position of the first UE determined based at least in part on the second UE being selected from the set of UEs to perform the second position acquisition procedure.

3. The method of claim 1, further comprising:
    calculating the relative position of the first UE to the second UE based at least in part on a previous position of the first UE and a position of the second UE at a time of the previous position of the first UE.

4. The method of claim 1, further comprising:
    transmitting, to a network, the second UE, or a third UE of a set of UEs comprising the first UE, the second UE, and the third UE, a set of measurements comprising a round trip time associated with communications between the first UE and the second UE, a time of flight associated with the communications between the first UE and the second UE, an angle of arrival associated with the communications between the first UE and the second UE, or a combination thereof; and
    receiving, from the network, the second UE, or the third UE, an indication of the relative position of the first UE to the second UE based at least in part on the set of measurements.

5. The method of claim 1, further comprising:
    calculating the relative position of the first UE to the second UE based at least in part on a distance from the first UE to the second UE, an orientation of a vehicle on which the first UE and the second UE are located, or a combination thereof.

6. The method of claim 5, further comprising:
    determining the distance from the first UE to the second UE based at least in part on a round trip time associated with communications between the first UE and the second UE or a time of flight associated with the communications between the first UE and the second UE.

7. The method of claim 5, further comprising:
    receiving, from the second UE or a third UE of a set of UEs comprising the first UE, the second UE, and the third UE, an indication of the orientation of the vehicle.

8. The method of claim 1, wherein the relative position of the first UE to the second UE for determining the second position of the first UE is configured to be a null distance, wherein determining the second position of the first UE comprises:
    determining that the second position of the first UE corresponds to a position of the second UE based at least in part on the relative position of the first UE to the second UE being configured to be the null distance.

9. The method of claim 1, wherein determining the second position of the first UE comprises:
    calculating the second position of the first UE based at least in part on a position of the second UE and the relative position of the first UE to the second UE.

10. The method of claim 9, further comprising:
    receiving, from a network, the second UE, or a third UE of a set of UEs comprising the first UE, the second UE, and the third UE, an indication of the position of the second UE.

11. The method of claim 1, further comprising:
    receiving, from a network, the second UE, or a third UE of a set of UEs comprising the first UE, the second UE, and the third UE, an indication of the second position of the first UE, wherein determining the second position of the first UE is based at least in part on receiving the indication.

12. The method of claim 1, further comprising:
    transmitting, to a network, a first set of parameters comprising a signal-to-noise ratio of a signal received from the global navigation satellite system, a remaining battery power of the first UE, one or more pathloss values associated with communicating with a set of UEs comprising the first UE and the second UE, or a combination thereof; and
    receiving, from the network, an indication that the second UE is selected from the set of UEs to perform a second position acquisition procedure using the global navigation satellite system based at least in part on the first set of parameters.

13. The method of claim 1, further comprising:
    broadcasting, to a set of UEs comprising the first UE and the second UE, a first indication of a first set of parameters comprising a signal-to-noise ratio of a first signal received at the first UE from the global navigation satellite system, a remaining battery power of the first UE, one or more pathloss values from the first UE to the set of UEs, or a combination thereof;
    receiving, from one or more UEs of the set of UEs including at least the second UE, one or more second indications of one or more second sets of parameters comprising a signal-to-noise ratio of a second signal received at a respective UE of the one or more UEs from the global navigation satellite system, a remaining battery power of the respective UE, one or more pathloss values from the respective UE to the set of UEs, or a combination thereof; and
    selecting the second UE to perform a second position acquisition procedure using the global navigation satellite system based at least in part on the first set of parameters and the one or more second sets of parameters.

14. The method of claim 1, further comprising:
    determining, after resetting the timer, a third position of the first UE based at least in part on: a second relative position of the first UE to a third UE of a set of UEs comprising the first UE, the second UE, and the third UE, and the third UE being selected from the set of UEs to perform a second position acquisition procedure using the global navigation satellite system; and resetting the timer in response to determining the second position of the first UE.

15. The method of claim 1, further comprising:
performing a second position acquisition procedure using the global navigation satellite system to determine a third position of the first UE based at least in part on an expiration of a second timer, wherein the timer has a first duration shorter than a second duration of the second timer.

16. The method of claim 1, further comprising:
transmitting an uplink message to a network, wherein a time compensation, a frequency compensation, or a combination thereof, associated with transmitting the uplink message is based at least in part on the second position of the first UE determined based at least in part on the relative position of the first UE to the second UE.

17. A first user equipment (UE) for wireless communication, comprising:
one or more memories storing processor executable code; and
one or more processors coupled with the one or more memories and individually or collectively operable to execute the code to cause the first UE to:
initiate a timer based at least in part on performing a position acquisition procedure using a global navigation satellite system to determine a first position of the first UE, wherein an expiration of the timer indicates for the first UE to perform the position acquisition procedure;
determine, prior to the expiration of the timer, a second position of the first UE based at least in part on a relative position of the first UE to a second UE; and
reset the timer in response to determining the second position of the first UE.

18. The first UE of claim 17, wherein the second UE is selected from a set of UEs comprising the first UE and the second UE to perform a second position acquisition procedure using the global navigation satellite system, the second position of the first UE determined based at least in part on the second UE being selected from the set of UEs to perform the second position acquisition procedure.

19. The first UE of claim 17, wherein the one or more processors are individually or collectively further operable to execute the code to cause the first UE to:
calculate the relative position of the first UE to the second UE based at least in part on a previous position of the first UE and a position of the second UE at a time of the previous position of the first UE.

20. The first UE of claim 17, wherein the one or more processors are individually or collectively further operable to execute the code to cause the first UE to:
transmit, to a network, the second UE, or a third UE of a set of UEs comprising the first UE, the second UE, and the third UE, a set of measurements comprising a round trip time associated with communications between the first UE and the second UE, a time of flight associated with the communications between the first UE and the second UE, an angle of arrival associated with the communications between the first UE and the second UE, or a combination thereof; and receive, from the network, the second UE, or the third UE, an indication of the relative position of the first UE to the second UE based at least in part on the set of measurements.

21. The first UE of claim 17, wherein the one or more processors are individually or collectively further operable to execute the code to cause the first UE to:
calculate the relative position of the first UE to the second UE based at least in part on a distance from the first UE to the second UE, an orientation of a vehicle on which the first UE and the second UE are located, or a combination thereof.

22. The first UE of claim 17, wherein the relative position of the first UE to the second UE for determining the second position of the first UE is configured to be a null distance, wherein, to determine the second position of the first UE, the one or more processors are individually or collectively further operable to execute the code to cause the first UE to:
determine that the second position of the first UE corresponds to a position of the second UE based at least in part on the relative position of the first UE to the second UE being configured to be the null distance.

23. The first UE of claim 17, wherein the one or more processors are individually or collectively further operable to execute the code to cause the first UE to:
calculate the second position of the first UE based at least in part on a position of the second UE and the relative position of the first UE to the second UE.

24. The first UE of claim 17, wherein the one or more processors are individually or collectively further operable to execute the code to cause the first UE to:
receive, from a network, the second UE, or a third UE of a set of UEs comprising the first UE, the second UE, and the third UE, an indication of the second position of the first UE, wherein determining the second position of the first UE is based at least in part on receiving the indication.

25. The first UE of claim 17, wherein the one or more processors are individually or collectively further operable to execute the code to cause the first UE to:
transmit, to a network, a first set of parameters comprising a signal-to-noise ratio of a signal received from the global navigation satellite system, a remaining battery power of the first UE, one or more pathloss values associated with communicating with a set of UEs comprising the first UE and the second UE, or a combination thereof; and receive, from the network, an indication that the second UE is selected from the set of UEs to perform a second position acquisition procedure using the global navigation satellite system based at least in part on the first set of parameters.

26. The first UE of claim 17, wherein the one or more processors are individually or collectively further operable to execute the code to cause the first UE to:
broadcast, to a set of UEs comprising the first UE and the second UE, a first indication of a first set of parameters comprising a signal-to-noise ratio of a first signal received at the first UE from the global navigation satellite system, a remaining battery power of the first UE, one or more pathloss values from the first UE to the set of UEs, or a combination thereof;

receive, from one or more UEs of the set of UEs including at least the second UE, one or more second indications of one or more second sets of parameters comprising a signal-to-noise ratio of a second signal received at a respective UE of the one or more UEs from the global navigation satellite system, a remaining battery power of the respective UE, one or more pathloss values from the respective UE to the set of UEs, or a combination thereof; and select the second UE to perform a second position acquisition procedure using the global navigation satellite system based at least in part on the first set of parameters and the one or more second sets of parameters.

27. The first UE of claim 17, wherein the one or more processors are individually or collectively further operable to execute the code to cause the first UE to:

determine, after resetting the timer, a third position of the first UE based at least in part on: a second relative position of the first UE to a third UE of a set of UEs comprising the first UE, the second UE, and the third UE, and the third UE being selected from the set of UEs to perform a second position acquisition procedure using the global navigation satellite system; and reset the timer in response to determining the second position of the first UE.

28. The first UE of claim 17, wherein the one or more processors are individually or collectively further operable to execute the code to cause the first UE to:

perform a second position acquisition procedure using the global navigation satellite system to determine a third position of the first UE based at least in part on an expiration of a second timer, wherein the timer has a first duration shorter than a second duration of the second timer.

29. An apparatus for wireless communication at a first user equipment (UE), comprising:

means for initiating a timer based at least in part on performing a position acquisition procedure using a global navigation satellite system to determine a first position of the first UE, wherein an expiration of the timer indicates for the first UE to perform the position acquisition procedure;

means for determining, prior to the expiration of the timer, a second position of the first UE based at least in part on a relative position of the first UE to a second UE; and means for resetting the timer in response to determining the second position of the first UE.

30. A non-transitory computer-readable medium storing code for wireless communication at a first user equipment (UE), the code comprising instructions executable by one or more processors to:

initiate a timer based at least in part on performing a position acquisition procedure using a global navigation satellite system to determine a first position of the first UE, wherein an expiration of the timer indicates for the first UE to perform the position acquisition procedure;

determine, prior to the expiration of the timer, a second position of the first UE based at least in part on a relative position of the first UE to a second UE; and reset the timer in response to determining the second position of the first UE.

* * * * *